United States Patent
Baek

(10) Patent No.: US 10,216,276 B2
(45) Date of Patent: Feb. 26, 2019

(54) TERMINAL AND OPERATING METHOD THEREOF

(71) Applicant: LG ELECTRONICS INC., Seoul (KR)

(72) Inventor: Bumhyeon Baek, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 45 days.

(21) Appl. No.: 14/639,763

(22) Filed: Mar. 5, 2015

(65) Prior Publication Data

US 2016/0116982 A1   Apr. 28, 2016

(30) Foreign Application Priority Data

Oct. 28, 2014   (KR) .......................... 10-2014-0147146

(51) Int. Cl.
  *G06F 3/01*    (2006.01)
  *H04N 5/77*    (2006.01)
  *H04N 9/82*    (2006.01)

(52) U.S. Cl.
  CPC ............. *G06F 3/016* (2013.01); *H04N 5/772* (2013.01); *H04N 9/8205* (2013.01)

(58) Field of Classification Search
  None
  See application file for complete search history.

(56) References Cited

U.S. PATENT DOCUMENTS

| | | | |
|---|---|---|---|
| 2011/0025480 A1 | 2/2011 | Hwang et al. | |
| 2012/0105326 A1 | 5/2012 | Jeong et al. | |
| 2013/0038603 A1* | 2/2013 | Bae | G06F 3/016 345/419 |
| 2014/0205260 A1* | 7/2014 | Lacroix | H04N 5/765 386/201 |
| 2015/0106770 A1* | 4/2015 | Shah | H04M 1/64 715/863 |
| 2015/0160728 A1* | 6/2015 | Yagi | H04M 1/72569 345/156 |

FOREIGN PATENT DOCUMENTS

| | | | |
|---|---|---|---|
| JP | 2011-238205 | 11/2011 | |
| JP | WO2013168732 | * 11/2013 | ............ G06F 3/016 |
| JP | 2014-038588 | 2/2014 | |
| KR | 10-2013-0054086 | 5/2013 | |

OTHER PUBLICATIONS

PCT International Application No. PCT/KR2015/002234, Written Opinion of the International Searching Authority dated Jul. 24, 2015, 3 pages.

* cited by examiner

*Primary Examiner* — Ifedayo B Iluyomade
(74) *Attorney, Agent, or Firm* — Lee, Hong, Degerman, Kang & Waimey

(57) ABSTRACT

Provided is an operating method of a terminal. The method includes: capturing an image for an object; obtaining movement information on a movement of the object; and storing the obtained movement information corresponding to the captured image.

15 Claims, 30 Drawing Sheets

FIG.6
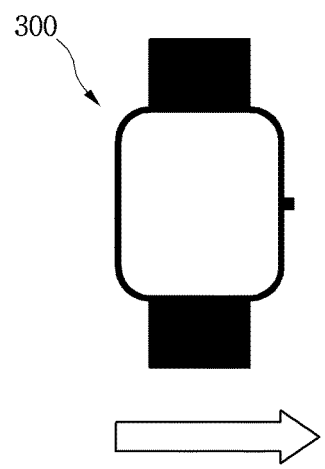
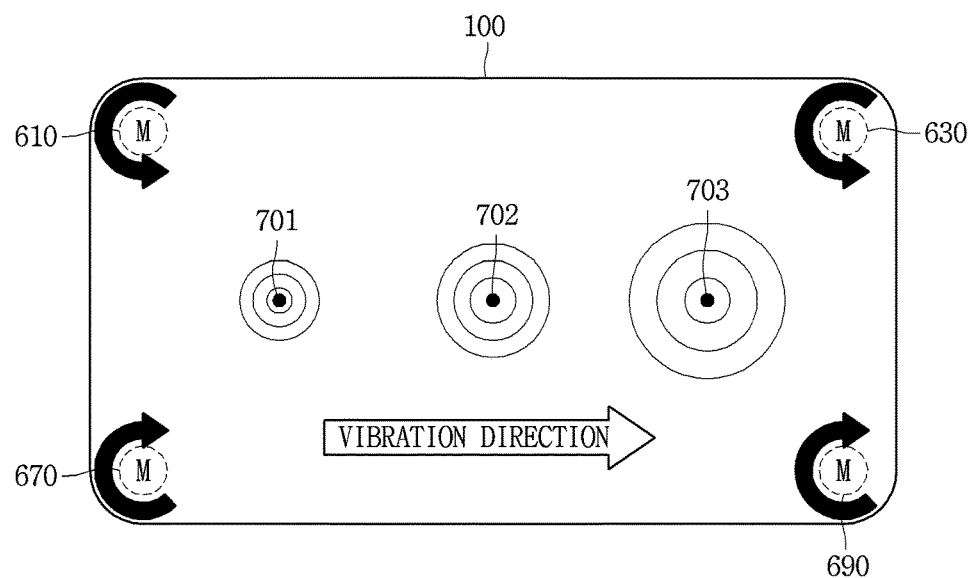

FIG.7
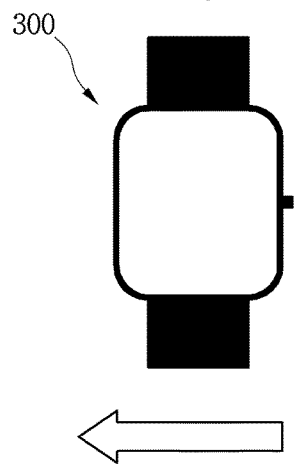
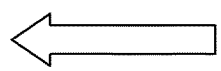
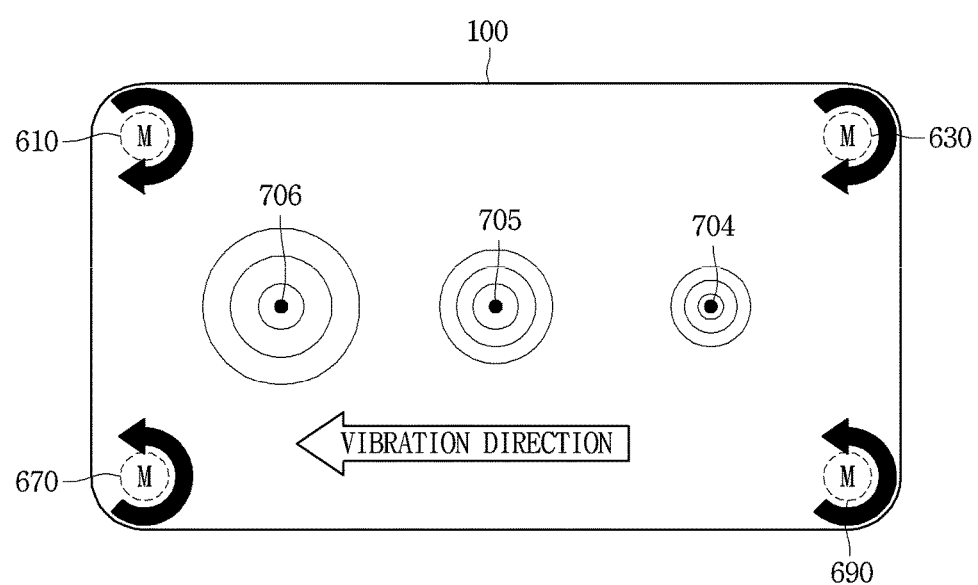

FIG.8
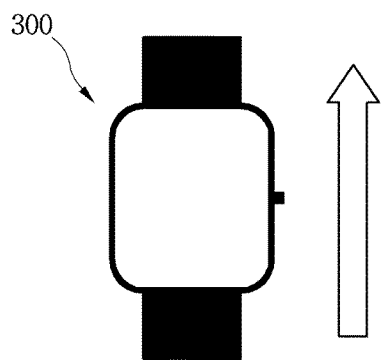
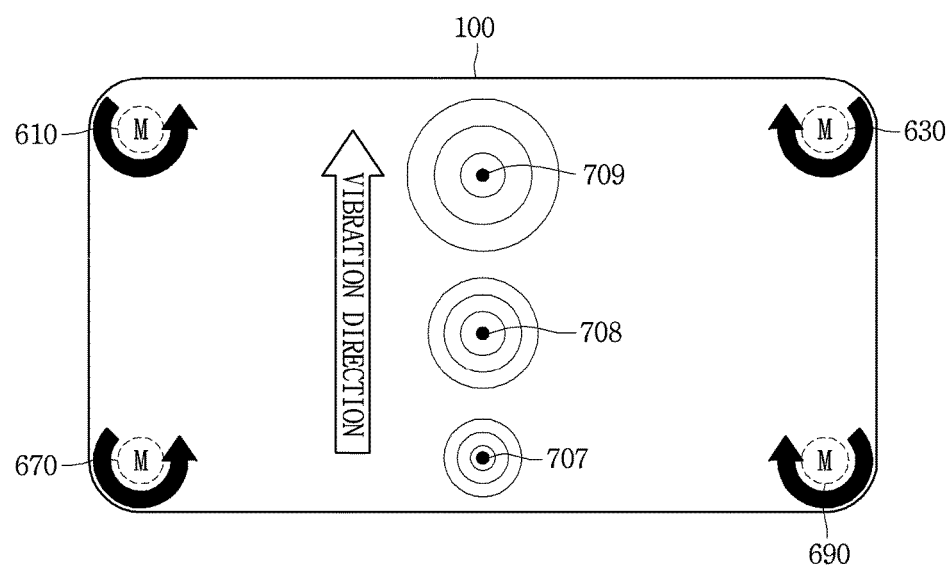

FIG.9
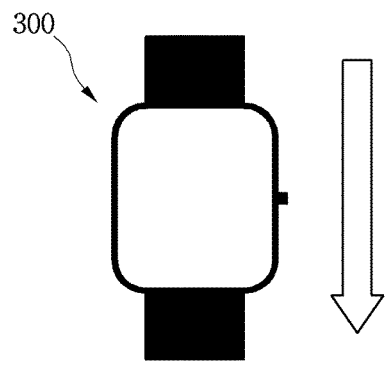
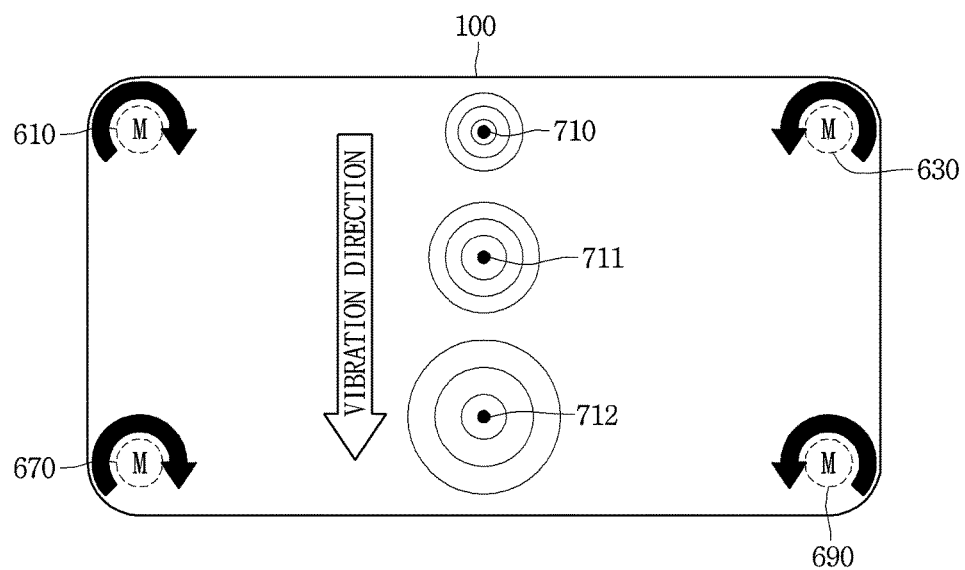

FIG.10
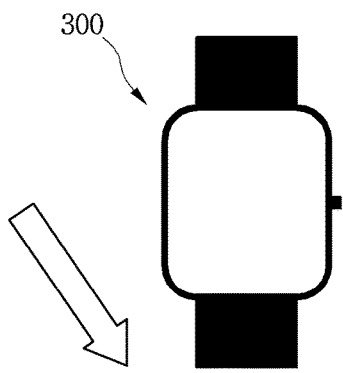
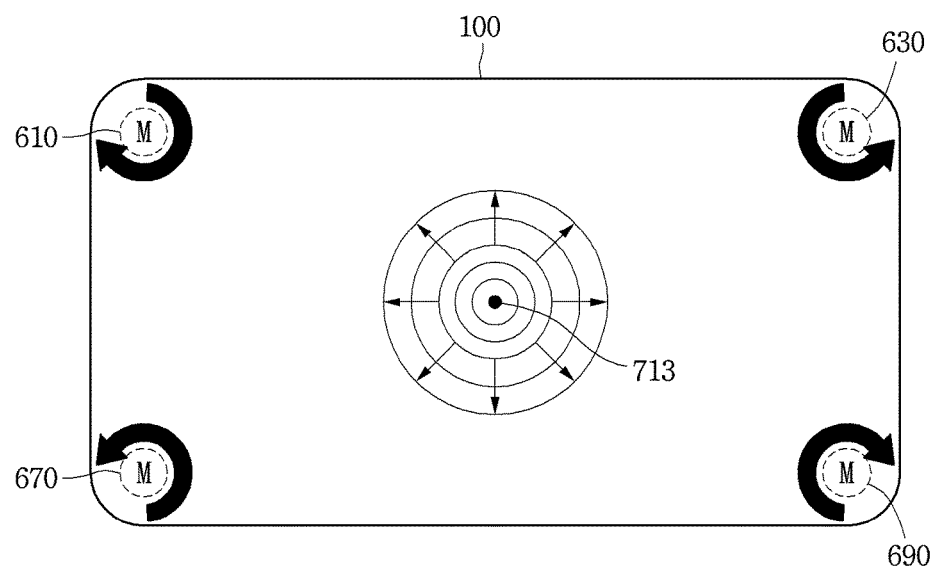

FIG.17
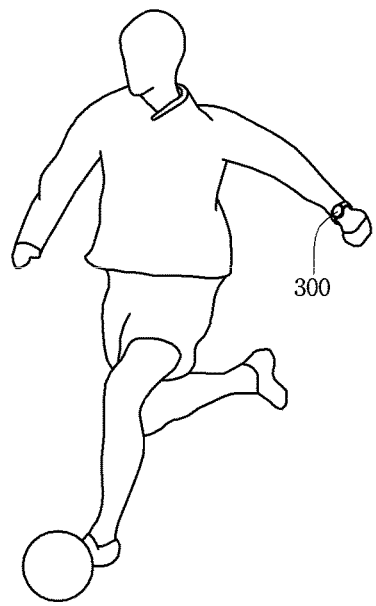
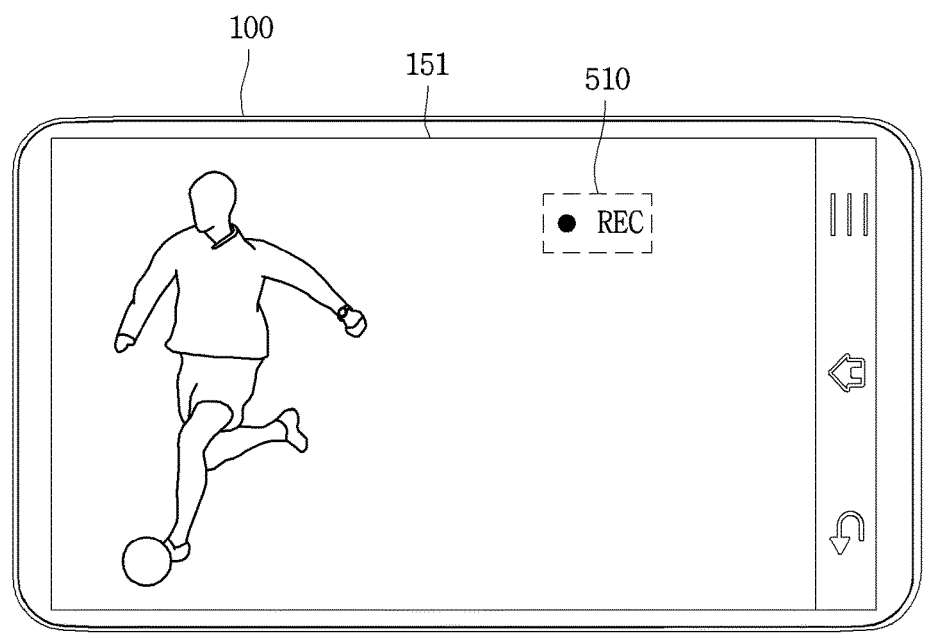

FIG.18
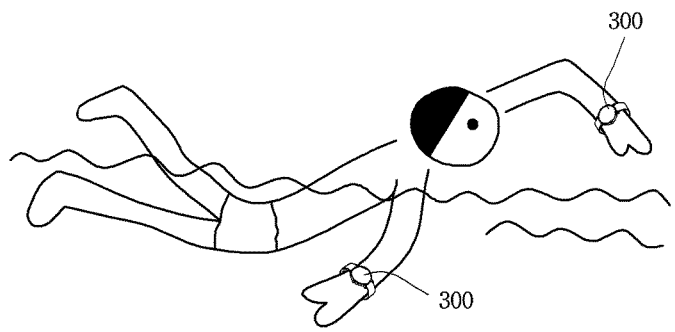
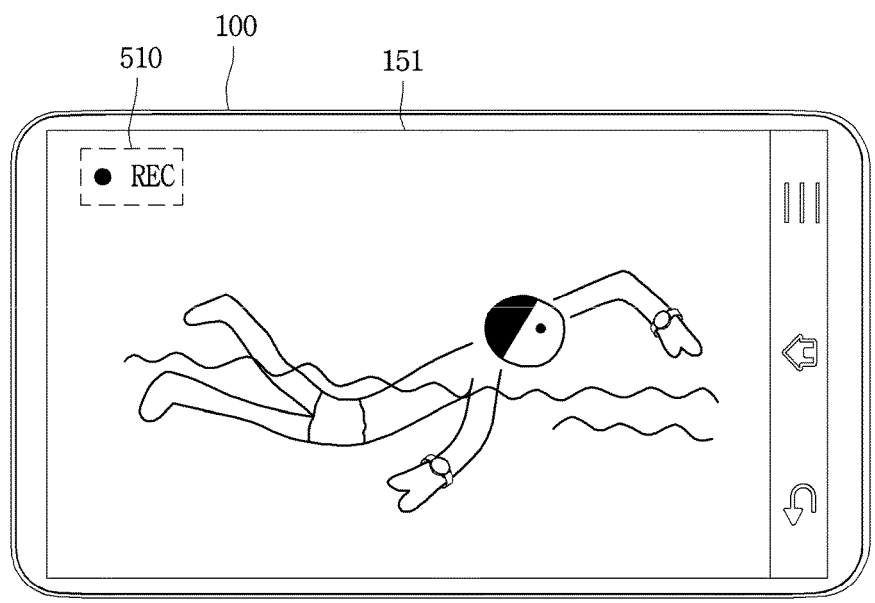

FIG.20
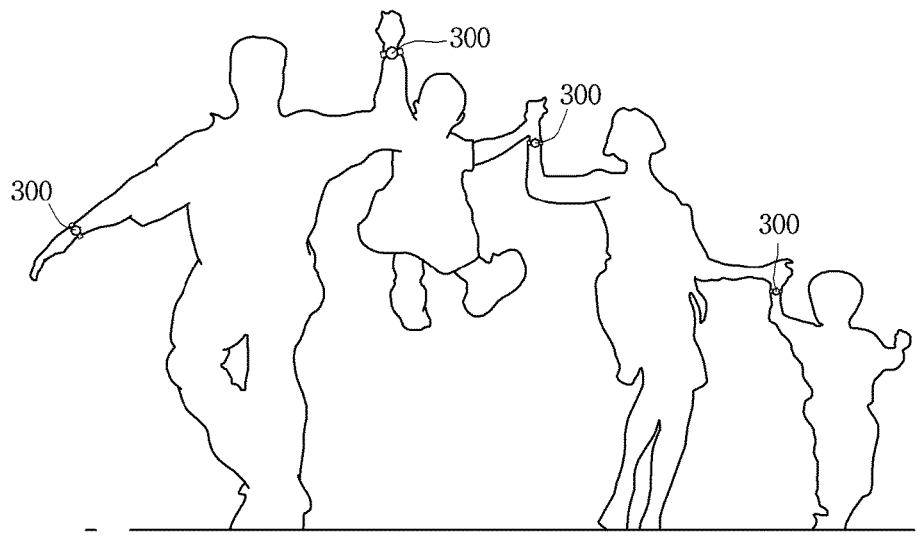
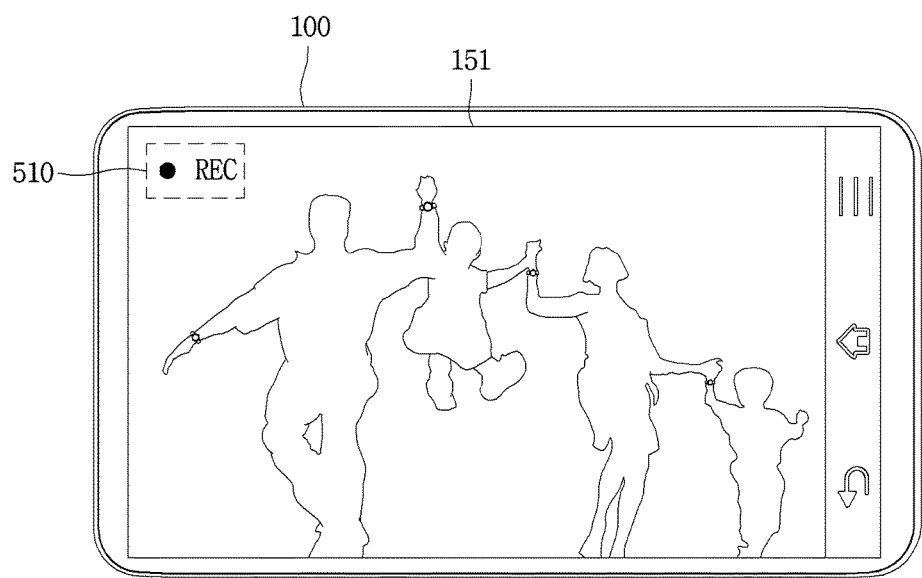

FIG.23
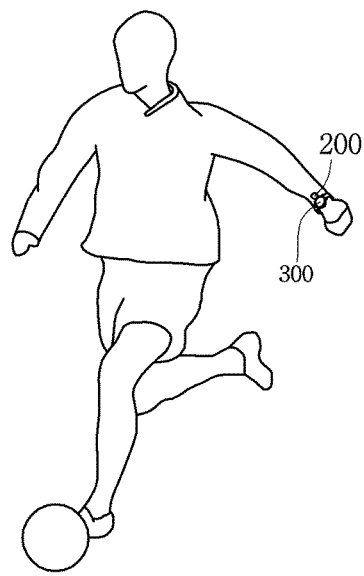
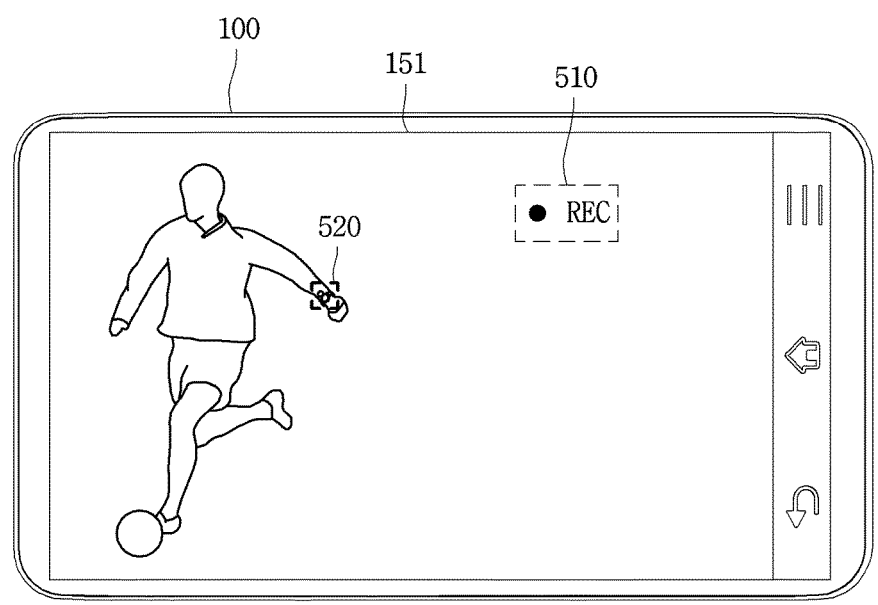

TERMINAL AND OPERATING METHOD THEREOF

CROSS-REFERENCE TO RELATED APPLICATIONS

Pursuant to 35 U.S.C. § 119(a), this application claims the benefit of earlier filing date and right of priority to Korean Patent Application No. 10-2014-0147146, filed on Oct. 28, 2014, the contents of which are hereby incorporated by reference herein in its entirety.

BACKGROUND

The present disclosure relates to a terminal and an operating method thereof, and particularly, to a terminal obtaining movement data for a movement of an object during image capturing and providing vibration according to the obtained movement data during the playback of a captured image.

Depending on whether terminals are mobile, the terminals are divided into mobile/portable terminals and stationary terminals. Again, the terminals may be divided into hand-held terminals and vehicle mount terminals depending on whether users can carry the terminals personally.

As functions of a terminal are diversified, such a terminal may be implemented in a form of a multimedia player having multi-functions, for example, photo or video capturing, playback of music or video files, game plays, and broadcast reception.

Moreover, wearable terminals in the form wearable on a body are being developed in recent years. For example, there are watch-type terminals wearable on a wrist, glass-type terminals wearable on a head, and band-type terminals.

The wearable terminals provide the same performance and function as general terminals. Accordingly, a user may perform various operations and obtain a variety of information through a wearable terminal. Then, the wearable terminal may collect various data relating to a user by using the advantage of being worn on the body of a user directly.

Recently, an image such as pictures and videos may be easily captured by using a terminal and captured pictures or videos may be shared with other users easily. Then, as the performance of a terminal is improved, the quality of a captured image is improved also.

However, images captured through a terminal may be viewed simply through a screen but more realistic images may not be provided to users. Therefore, a terminal providing a sense relating to a captured image in additional to a visual image and an operating method thereof are required.

SUMMARY

Embodiments provide a device obtaining information on a movement of an object during image capturing and providing vibration on a movement of an object to a user during image playback.

Embodiments also provide a device obtaining movement data on a movement of an object through various methods.

In one embodiment, provided is an operating method of a terminal. The method includes: capturing an image for an object; obtaining movement information on a movement of the object; and storing the obtained movement information corresponding to the captured image.

In another embodiment, a terminal includes: a camera capturing an image for an object; and a control unit obtaining movement information on a movement of the object and storing the obtained movement information corresponding to the captured image.

The details of one or more embodiments are set forth in the accompanying drawings and the description below. Other features will be apparent from the description and drawings, and from the claims.

BRIEF DESCRIPTION OF THE DRAWINGS

FIG. 6 is a view illustrating a vibration operation of a terminal according to an embodiment of the present invention.

FIG. 7 is a view illustrating a vibration operation of a terminal according to another embodiment of the present invention.

FIG. 8 is a view illustrating a vibration operation of a terminal according to another embodiment of the present invention.

FIG. 9 is a view illustrating a vibration operation of a terminal according to another embodiment of the present invention.

FIG. 10 is a view illustrating a vibration operation of a terminal according to another embodiment of the present invention.

FIGS. 17 to 20 are views illustrating a movement data acquisition of an object according to an embodiment of the present invention.

FIG. 23 is a view of obtaining an object movement through marker recognition according to an embodiment of the present invention.

DETAILED DESCRIPTION OF THE EMBODIMENTS

Figure 1:
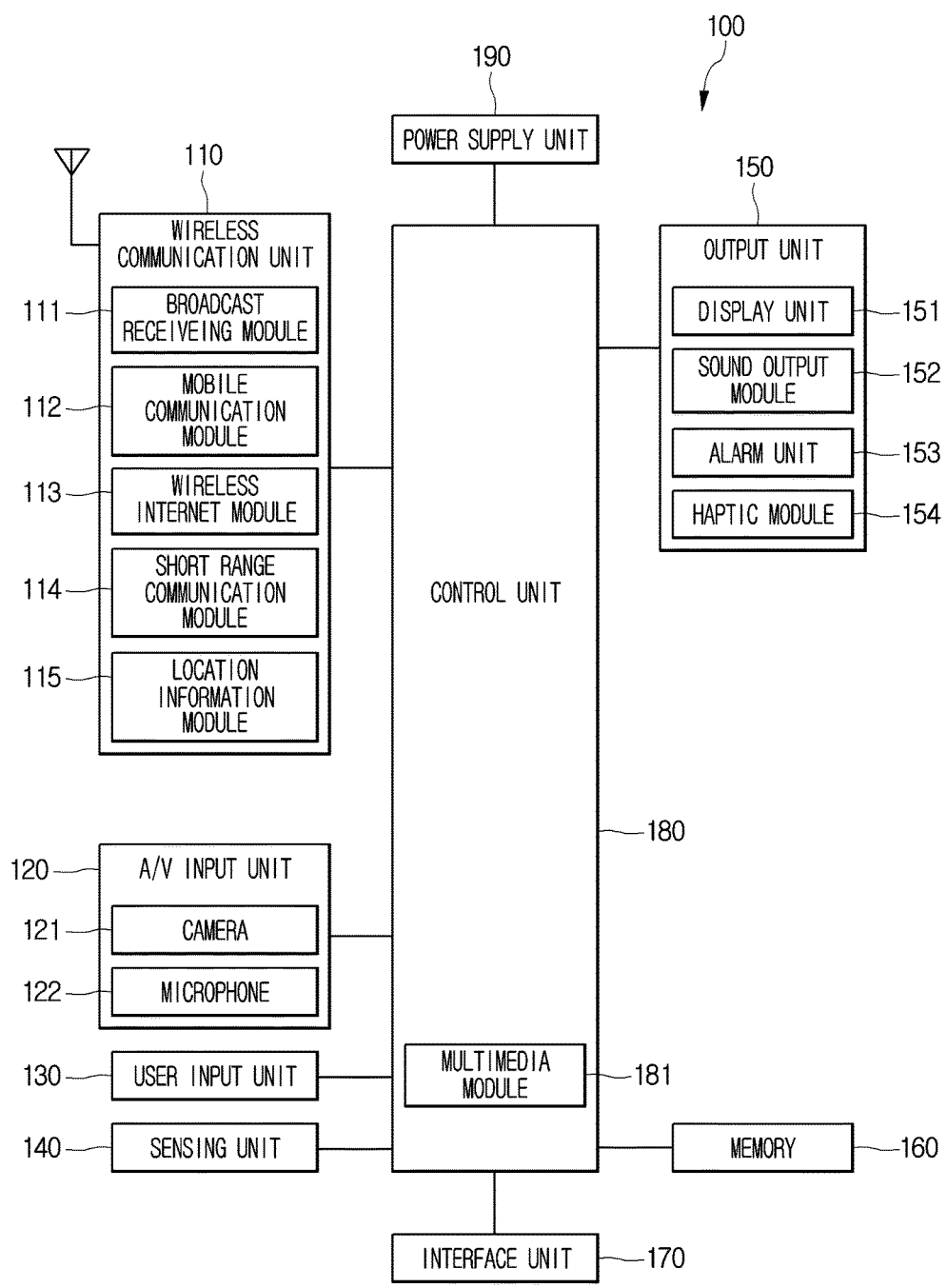
FIG. 1 is a block diagram illustrating a terminal according to an embodiment of the present invention.

Hereinafter, embodiments of the present invention are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and, do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present invention is not limited thereto. It should be understood that all of variations, equivalents or substitutes contained in the concept and technical scope of the present invention are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

The terms of a singular form may include plural forms unless they have a clearly different meaning in the context.

Additionally, in this specification, the meaning of "include," "comprise," "including," or "comprising," specifies a property, a region, a fixed number, a step, a process, an element and/or a component but does not exclude other properties, regions, fixed numbers, steps, processes, elements and/or components.

Terminals described in this specification may include mobile phones, smartphones, laptop computers, terminals for digital broadcast, personal digital assistants (PDAs), portable multimedia players (PMPs), navigation systems, slate PCs, tablet PCs, ultrabooks, and wearable devices (for example, smartwatchs, smart glasses, and head mounted displays (HMDs)).

However, it is apparent to those skilled in the art that configurations according to embodiments of the present invention disclosed in this specification are applicable to stationary terminals such as digital TVs, desktop computers, and digital signage, except for the case applicable to only terminals.

Then, a structure of a terminal according to an embodiment of the present invention will be described with reference to FIG. 1.

FIG. 1 is a block diagram illustrating a terminal according to an embodiment of the present invention.

The terminal 100 may include a wireless communication unit 110, an Audio/Video (A/V) input unit 120, a user input unit 130, a sensing unit 140, an output unit 150, a memory 160, an interface unit 170, a control unit 180, and a power supply unit 190. Since components shown in FIG. 1 are not essential, a terminal including more or less components may be implemented.

Hereinafter, the components will be described in order.

The wireless communication unit 110 may include at least one module allowing wireless communication between the terminal 100 and a wireless communication system, between the terminal 100 and another terminal 100, or between the terminal 100 and an external server. Additionally, the wireless communication unit 110 may include at least one module connecting the terminal 100 to at least one network.

The wireless communication unit 110 may include at least one of a broadcast receiving module 111, a mobile communication module 112, a wireless internet module 113, a short-range communication module 114, and a location information module 115.

The broadcast receiving module 111 may receive a broadcast signal and/or broadcast related information from an external broadcast management server through a broadcast channel.

The broadcast channel may include a satellite channel and a terrestrial channel. The broadcast management server may mean a server generating and transmitting broadcast signals and/or broadcast related information or a server receiving pre-generated broadcast signals and/or broadcast related information and transmitting them to a terminal. The broadcast signal may include TV broadcast signal, radio broadcast signal, and data broadcast signal and also may include broadcast signal in a form in which data broadcast signal is combined with TV broadcast signal or radio broadcast signal.

The broadcast related information may mean information relating to a broadcast channel, a broadcast program, or a broadcast service provider. The broadcast related information may be provided through a mobile communication network. In this case, the broadcast related information may be received by the mobile communication module 112.

The broadcast related information may exist in various forms. For example, the broadcast related information may exist in a form, for example, Electronic Program Guide (EPG) of Digital Multimedia Broadcasting (DMB) or Electronic Service Guide (ESG) of Digital Video Broadcast-Handheld (DVB-H).

The broadcast receiving module 111 may receive digital broadcast signals by using a digital broadcast system, for example, Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), and Integrated Services Digital Broadcast-Terrestrial (ISDB-T). Of course, the broadcast receiving module 111 may be configured to match another broadcast system in addition to the above-mentioned broadcast system.

Broadcast signal and/or broadcast related information received through the broadcast receiving module 111 may be stored in the memory 160.

The mobile communication module 112 transmits/receives wireless signals with at least one of a base station, an external terminal, and a server on a mobile communication network. The wireless signal may include various types of data according to a voice call signal, a video call signal, or text/multimedia message transmission.

The wireless internet module 113 refers to a module for wireless internet access and may be built in or external to the terminal 100. Wireless internet technique may include Wireless LAN (WLAN) (for example, Wi-Fi), Wireless broadband (Wibro), World Interoperability for Microwave Access (Wimax), and High Speed Downlink Packet Access (HSDPA).

The short-range communication module 114 refers to a module for short-range communication. A short range communication technique may include Bluetooth, Radio Frequency Identification (RFID), infrared Data Association (IrDA), Ultra Wideband (UWB), ZigBee, and Near Field Communication (NFC).

The location information module 115 is a module for obtaining the location (or the current location) of a terminal and its representative examples include a global positioning system (GPS) module or a Wi-Fi module. For example, the terminal may obtain its position by using a signal transmitted from a GPS satellite through the GPS module. As another example, a terminal may obtain its position on the basis of information of a wireless access point (AP) transmitting/receiving a wireless signal to/from the Wi-Fi module, through the Wi-Fi module. If necessary, the position information module 115 may perform a function of another module in the wireless communication unit 110 in order to obtain data on the location of a terminal substitutionally or additionally. The location information module 115 is a module for obtaining the position (or the current position) of a terminal and is not limited to a module directly calculating and obtaining the position of a terminal.

Referring to the A/V input unit 120 is for inputting audio signal or video signal and may include a camera 121 and a microphone 122. The camera 121 processes image frames such as a still image or a video obtained by an image sensor in a video call mode or a capturing mode. The processed video frame may be displayed on the display unit 151.

The video frame processed in the camera 121 may be stored in the memory 160 or transmitted to the outside through the wireless communication unit 110. The camera 121 may be provided in more than two according to a usage environment.

The microphone 122 receives an external sound signal by a microphone in a call mode, a recording mode, or a voice recognition mode and processes it as electrical voice data. In the case of a call mode, the processed voice data may be converted into a format transmittable to a mobile communication base station and then outputted through the mobile communication module 112. Various noise reduction algorithms for reducing noise occurring during a process for receiving external voice signal may be implemented in the microphone 122.

The input unit 120 may include a camera 121 or an image input unit for image signal input, a microphone 122 or an audio input unit for audio signal input, and a user input unit 123 (for example, a touch key and a mechanical key)) for receiving information from a user. Voice data or image data collected by the input unit 120 are analyzed and processed as a user's control command.

The user input unit 130 may have the same configuration as the above-mentioned input unit 123.

The sensing unit 140 may include at least one sensor for sensing at least one of information in a terminal, environmental information around a terminal, and user information. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, the camera 121), a microphone 122, a battery gauge, an environmental sensor (for example, a barometer, a hygrometer, a thermometer, a radiation sensor, a thermal sensor, and a gas sensor), and a chemical sensor (for example, an electronic noise, a healthcare sensor, and a biometric sensor). Moreover, a terminal disclosed in this specification may combines information sensed by at least two or more sensors among such sensors and may then utilize it.

The output unit 150 is used to generate a visual, auditory, or haptic output and may include at least one of a display unit 151, a sound output module 152, an alarm unit 153, and a haptic module 154. The display unit 151 may be formed with a mutual layer structure with a touch sensor or formed integrally, so that a touch screen may be implemented. Such a touch screen may serve as the user input unit 123 providing an input interface between the terminal 100 and a user and an output interface between the terminal 100 and a user at the same time.

The display unit 151 displays (outputs) information processed in the terminal 100. For example, when the terminal 100 is in a call mode, it displays a call related user interface (UI) or graphic user interface (GUI). When the terminal 100 is in a video call mode or a capturing mode, it displays a captured or/and received image, a UI, or a GUI.

The display unit 151 may include at least one of a liquid crystal display (LCD), a thin film transistor-liquid crystal display (a TFT LCD), an organic light-emitting diode (OLED), a flexible display, and a 3D display.

Some displays among them may be configured with a transparent or optical transmissive type to see the outside therethrough. This may be called a transparent display and its representative example includes Transparent OLED (TOLED). The display unit 151 may be configured with a rear structure or optical transmissive structure. By such a structure, a user may see an object disposed at the rear of a terminal body through an area that the display unit 151 of the terminal body occupies.

According to an implementation form of the terminal 100, the display unit 151 may be provided in more than two. For example, in the terminal 100, a plurality of display units may be disposed at one side separately or integrally, and may be disposed at different sides.

When a sensor (hereinafter referred to as a touch sensor) for sensing a touch operation of the display unit 151 forms a cross-layer structure (hereinafter referred to as a touch screen), the display unit 151 may be used as an input device in addition to an output device. The touch sensor 114 may have a form of a touch film, a touch sheet, and a touch pad, for example.

The touch sensor 144 may be configured to convert a change in pressure applied to a specific portion of the display unit 151 or capacitance occurring at a specific portion of the display unit 151. The touch sensor 144 may be configured to detect a pressure and a capacitance when touched in addition to a touched position and area.

When there is a touch input on the touch sensor 144, signals corresponding to thereto are transmitted to a touch controller. The touch controller processes the signals and then transmits the next corresponding data to the control unit 180. Therefore, the control unit 180 may identify which area of the display unit 151 is touched.

Additionally, the control unit 180 may determine the type of a user's touch input on the basis of an area, a pressure, and a capacitance when touched. Accordingly, the control unit 180 may identify a user's finger touch, nail touch, finger joint touch, and multi touch using a plurality of fingers.

Referring to FIG. 1, the proximity sensor 141 may be disposed in an inner area of a terminal surrounded by the touch screen or near the touch screen. The proximity sensor 141 refers to a sensor for detecting whether an object approaches a predetermined detection surface or there is an object near a predetermined detection surface by using the force of electromagnetic field or infrared ray. The proximity sensor 141 has a longer life cycle and a higher availability than a contact type sensor.

The proximity sensor 141 includes a transmissive type photoelectric sensor, a direct reflective type photoelectric sensor, a mirror reflective type photoelectric sensor, a high frequency oscillation type proximity sensor, a capacitive proximity sensor, a magnetic proximity sensor, and infrared proximity sensor. When the touch screen is a capacitive type, it is configured to detect the proximity of a pointer by using a change in electric field according to the proximity of the pointer. In this case, the touch screen (or the touch sensor) 144 may be classified as a proximity sensor.

Hereinafter, for convenience of description, an action for recognizing the pointer as on the touch screen while the pointer is close without contacting the touch screen is referred to as proximity touch and an action for actually contacting the touch screen with the pointer is referred to as contact touch. A position where the pointer is proximity-touched on the touch screen means a position that the pointer corresponds vertically when the pointer is proximity-touched.

The proximity sensor detects a proximity touch and a proximity touch pattern (for example, a proximity touch distance, a proximity touch direction, a proximity touch speed, a proximity touch time, a proximity touch position, and a proximity touch movement state). Information corresponding to the detected proximity touch operation and proximity touch pattern may be outputted on a touch screen.

The sound output module 152 may output audio data received from the wireless communication unit 110 or stored in the memory 160 in a call signal reception mode, a call mode, a recording mode, or a voice recognition mode. The sound output module 152 may output a sound signal relating to a function (for example, a call signal reception sound and a message reception sound) performed in the terminal 100. The sound output module 152 may include a receiver, a speaker, and a buzzer.

The alarm unit 153 outputs a signal for notifying an event occurrence of the terminal 100. An example of an event occurring in a terminal includes call signal reception, message reception, key signal input, and touch input. The alarm unit 153 may output a signal for notifying event occurrence in another form other than video signal or audio signal, for example, vibration. The video signal or the audio signal may be outputted through the display unit 151 or the sound output module 152 and the display unit 151 and the sound output module 152 may be classified as part of the alarm unit 153.

The haptic module 154 generates various haptic effects that a user can feel. A representative example of a haptic effect that the haptic module 154 generates includes vibration. The intensity and pattern that the haptic module 154 generates are controllable. For example, different vibrations may be synthesized and outputted or may be outputted sequentially.

The haptic module 154 may generate various haptic effects, for example, effects by a pin arrangement moving vertical to a contact skin surface, injection power or suction power of air through an injection port or a suction port, rubbing a skin surface, electrode contact, stimulus of electrostatic force and effects by the reproduction of cold/warm sense by using a device absorbing or emitting heat.

The haptic module 154 may be implemented to deliver a haptic effect through a direct contact and also allow a user to feel a haptic effect through a muscle sense such as a finger or an arm. The haptic module 154 may be more than two according to a configuration aspect of the terminal 100.

Additionally, the haptic module 154 may include a vibration device for generating vibration. For example, the haptic module 154 may include at least one vibration motor and the vibration motor may have various forms such as a bar type and a coin type.

Additionally, the haptic module 154 may be equipped at various positions according to a form of the terminal 100. For example, in the case of a watch-type terminal 300, the haptic module 154 may be included in at least one of a body 301 and a band 302 of the watch-type terminal 300.

Additionally, the memory 160 may store data supporting various functions of the terminal 100. The memory 160 may store a plurality of application programs (for example, application programs or applications) running on the terminal 100 and also data and commands for operations of the terminal 100. At least part of such an application program may be downloaded from an external server through a wireless communication. Additionally, at least part of such an application program may be included in the terminal 100 from the time of shipment in order to perform a basic function (for example, an incoming call, a transmission function, and a message reception) of the terminal 100. Moreover, an application program may be stored in the memory 160 and installed on the terminal 100, so that it may run to perform an operation (or a function) of the terminal 100 by the control unit 180.

The memory 160 may include at least one type of storage medium among a flash memory type, a hard disk type, a multimedia card micro type, card type memory (for example, SD or XD memory), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, magnetic disk, and optical disk. The terminal 100 may operate in relation to a web storage performing a storage function of the memory 160 on internet.

The interface unit 170 may serve as a path to all home devices connected to the terminal 100. The interface unit 170 may receive data from an external device, receive power and deliver it to each component in the terminal 100, or transmit data in the terminal 100 to an external device. For example, the interface unit 170 may include a wired/wireless headset port, an external charger port, a wired/wireless data port, a memory card port, a port connecting a device equipped with an identification module, an audio I/O port, a video I/O port, and an earphone port.

Moreover, the identification module, as a chip storing various information for authenticating usage authority of the terminal 100, may include a user identity module (UIM), a subscriber identity module (SIM), and a universal subscriber identity module (USIM). A device equipped with an identification module (hereinafter referred to as an identification device) may be manufactured in a smart card form. Accordingly, the identification device may be connected to the terminal 100 through a port.

When the terminal 100 is connected to an external cradle, the interface unit 170 may be a path through which power of the cradle is supplied to the terminal 100 or a path through which various command signals inputted from the cradle are delivered to the terminal 100 by a user. The various command signals or the power inputted from the cradle may operate as a signal for recognizing that the terminal 100 is accurately mounted on the cradle.

The control unit 180 controls overall operations of a terminal in general. For example, the control unit 180 performs a control and processing relating to a voice call, data communication, and a video call. The control unit 180 may include a multimedia module 181 for playing multimedia. The multimedia module 181 may be implemented in the control unit 180 or may be implemented separated from the control unit 180.

The control unit 180 may perform pattern recognition processing so as to recognize handwriting input or drawing input on the touch screen as a text and an image, respectively.

The power supply unit 190 may receive external power or internal power under a control of the control unit 180 and may then supply power necessary for an operation of each component.

For example, various embodiments described herein may be implemented in a computer or device similar thereto readable medium by using software, hardware, or a combination thereof.

According to hardware implementation, embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units performing other functions. In some cases, such embodiments may be implemented by the control unit 180.

According to software implementation, embodiments for procedures or functions may be implemented with a separate software module performing at least one function or operation. Software code may be implemented by a software application written in appropriate programming language. The software code may be stored in the memory 160 and may be executed by the control unit 180.

The terminal 100 may be a portable terminal or a stationary terminal. Accordingly, the terminal 100 may be carried by a user personally or may be stationed in a predetermined area.

Moreover, a terminal may expand to a wearable device that can be worn on the body beyond the level that a user mainly grabs the mobile terminal by a hand. Such a wearable device may include a smart watch, a smart glass, and an HMD. Hereinafter, examples of a terminal expanding to a wearable device are described.

The wearable device may exchange data (or interoperate) with another terminal 100. The short-range communication module 114 may detect (or recognize) a wearable device around the terminal 100, which is capable of communicating with the terminal 100 Furthermore, if the detected wearable device is a device authenticated to communicate with the terminal 100, the control unit 180 may transmit at least part of data processed in the terminal 100 to the wearable device through the short-range communication module 114. Accordingly, a user may use the data processed in the terminal 100 through the wearable device. For example, when a call is received by the terminal 100, a user may perform a phone call through the wearable device or when a message is received by the terminal 100, a user may check the received message.

Figure 2:
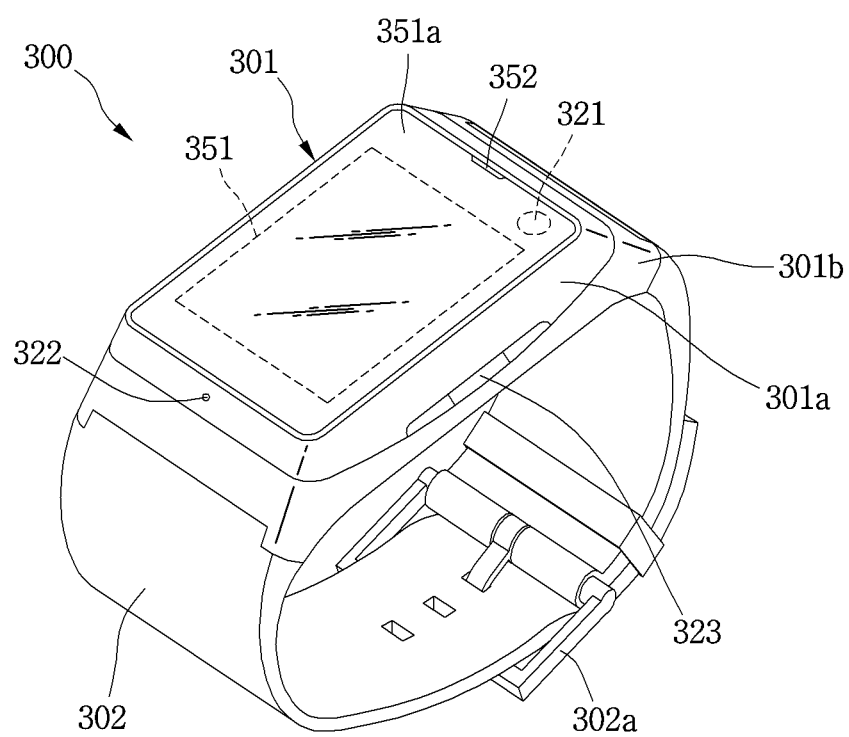
FIG. 2 is a perspective view illustrating a watch-type mobile terminal according to another embodiment of the present invention.

FIG. 2 is a perspective view illustrating a watch-type mobile terminal 300 according to another embodiment of the present invention.

Referring to FIG. 2, the watch-type mobile terminal 300 includes a body 301 including a display unit 351 and a band 302 connected to the body 301 to be worn on a wrist. In general, the mobile terminal 300 may have the same or similar features of the terminal 100. Accordingly, the watch-type terminal 300 may include a configuration included in the terminal 100.

The body 301 includes a case forming the appearance. As shown in the drawings, the case includes a first case 301a and a second case 301b preparing an inner space that receives various electronic components. However, the present invention is not limited thereto and one case may be configured to prepare the inner space so that the unibody terminal 300 may be implemented.

The watch-type terminal 300 may be configured to allow wireless communication and an antenna for the wireless communication may be installed at the body 301. Moreover, the antenna may expand its performance by using a case. For example, a case including a conductive material is electrically connected to an antenna to expand a ground area or a radiation area.

The display unit 351 is disposed at the front of the body 301 to output information and a touch sensor is equipped at the display unit 351 to be implemented as a touch screen. As shown in the drawing, a window 351a of the display unit 351 is mounted at the first case 301a to form the front of the terminal body together with the first case 301a.

The body 301 may include a sound output unit 352, a camera 321, a microphone 322, and a user input unit 323. When the display unit 351 is implemented as a touch screen, it may function as the user input unit 323 and accordingly, there is no additional key at the body 301.

The band 302 is worn on the wrist to surround it and may be formed of a flexible material in order for easy wearing. As such an example, the band 302 may be formed of leather, rubber, silicon, and synthetic resin. Additionally, the band 302 may be configured to be detachable from the body 301, so that it may be replaced with various forms of bands according to user preferences.

Moreover, the band 302 may be used to expand the performance of an antenna. For example, an antenna is electrically connected to a band so that a ground expansion unit (not shown) expanding a ground area may be built in.

The band 302 may include a fastener 302a. The fastener 302a may be implemented by a buckle, a snap-fit available hook structure, or velcro (a brand name) and may include a stretchable interval or material. This drawing illustrates an example that the fastener 302a is implemented in a buckle form.

Moreover, the control unit 380 may control the watch-type terminal 300 overall and may perform an event alarm operation through the display unit 351, the sound output unit 352, and the haptic module 354.

Additionally, the control unit 380 may recognize whether a position where the watch-type terminal 300 is worn is the left or right wrist of a user. For example, the control unit 380 may recognize a position where the watch-type terminal 300 is worn on the basis of at least one of a movement of a user, a body state of a user, a body form of a user contacting the watch-type terminal 300, and body information. As an embodiment, the control unit 380 may recognize a position where the watch-type terminal 300 is worn on the basis of blood information on a user contacting at least one of the body 301 and the band 302.

The watch-type terminal 300 may include a sensing unit 340. The sensing unit 140, as a configuration corresponding to the sensing unit 140 of the terminal 100, may include at least one sensor for sensing at least one of information in the watch-type terminal 300, information on an environment surrounding the watch-type terminal 300, and user information. For example, the sensing unit 340 may include at least one of a proximity sensor, an illumination sensor, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, a camera), a microphone, a battery gauge, an environmental sensor (for example, a barometer, a hygrometer, a thermometer, a radiation sensor, a thermal sensor, and a gas sensor), and a chemical sensor (for example, an electronic noise, a healthcare sensor, and a biometric sensor). Moreover, a terminal disclosed in this specification may combines information sensed by at least two or more sensors among such sensors and may then utilize it.

Additionally, the watch-type terminal 300 may include a haptic module 354 having the same configuration as the above-mentioned haptic module 154. The haptic module 354 generates various haptic effects that a user can feel. A representative example of a haptic effect that the haptic module 354 generates includes vibration. The intensity and pattern that the haptic module 354 generates are controllable. For example, the haptic module 354 may synthesize and output different vibrations or output different vibrations sequentially. Then, the haptic module 354 may include a plurality of vibration devices and may control each of at least one of a movement pattern, a vibration intensity, and a vibration time of the plurality of vibration devices. This will be described later.

The haptic module 354 may generate various haptic effects, for example, effects by a pin arrangement moving vertical to a contact skin surface, injection power or suction power of air through an injection port or a suction port, rubbing a skin surface, electrode contact, stimulus of electrostatic force and effects by the reproduction of cold/warm sense by using a device absorbing or emitting heat.

The haptic module 354 may be implemented to deliver a haptic effect through a direct contact and also allow a user to feel a haptic effect through a muscle sense such as a finger or an arm. The haptic module 354 may be more than two according to a configuration aspect of the watch-type terminal 300. For example, a plurality of haptic modules 354 may be equipped in the body 301 and the band 302 of the watch-type terminal 300.

Additionally, the haptic module 354 may include a vibration device 600 for generating vibration. For example, the haptic module 354 may include at least one vibration device 600 and the vibration device 600 may have various forms such as a bar type and a coin type.

Figure 3:
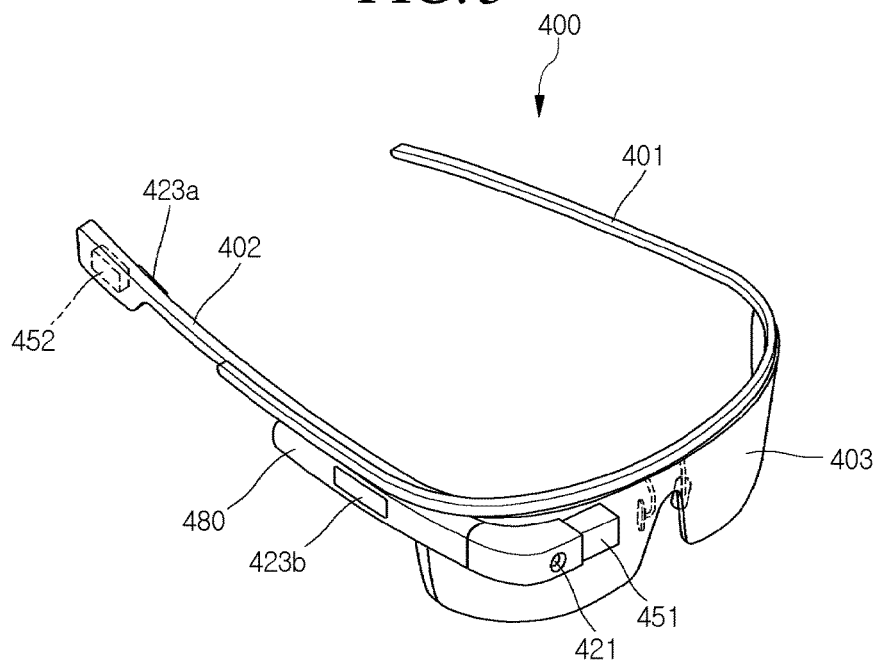
FIG. 3 is a perspective view illustrating a glass-type mobile terminal according to another embodiment of the present invention.

FIG. 3 is a perspective view illustrating a glass-type terminal 400 according to another embodiment of the present invention.

The glass-type terminal 400 may be configured to be worn on the head portion of a human body and for this, may include a frame part (for example, a case and a housing). The frame part may be formed of a flexible material in order for each wearing. In this drawing, it is shown that the frame part includes a first frame 401 and a second frame 402 formed of different materials. In general, the mobile terminal 400 may have the same or similar feature to the terminal 100 of FIG. 1.

The frame part is supported by the head portion and provides a space for mounting various components. As shown in the drawing, electronic components such as a control module 480 and a sound output module 452 may be mounted at the frame part. Additionally, a lens 403 covering at least one of the left eye and the right eye may be detachably mounted at the frame part.

The control module 480 may be configured to control various electronic components equipped at the terminal 400. The control module 480 may be understood as a component corresponding to the above-described control unit 180. In this drawing, the control module 480 is installed at the frame part on one side of the head portion. However, the position of the control module 480 is not limited thereto.

The display unit 451 may be implemented in an HMD form. The HMD form refers to a display method for displaying an image directly in front of the user's eyes. When a user wears a glass-type terminal 400, in order to provide an image directly in front of the user's eyes, the display unit 451 may be disposed in correspondence to at least one of the left eye and the right eye. In this drawing, in order to output an image toward the user's right eye, the display unit 451 is disposed in correspondence to a portion corresponding to the right eye.

The display unit 451 may project an image to the user's eye by using a prism. Additionally, in order to allow a user to see the projected image and a general front view (that is, a range that the user can see through the eyes), the prism may be transparent.

In such a way, an image outputted through the display unit 451 may be overlapped with a general view and displayed. The terminal 400 may provide augmented reality (AR) superimposing a virtual image on a real image or a background and displaying it as one image by using characteristics of such a display.

The camera 421 is disposed adjacent to at least one of the left eye and the right eye to capture a front image. Since the camera 421 is disposed adjacent to the eye, it may obtain an image of a scene that a user sees.

In this drawing, the camera 421 is equipped at the control module 480 but the present invention is not limited thereto. The camera 421 may be installed at the frame part and may be provided in plurality to obtain a three-dimensional image.

The glass-type terminal 400 may include user input units 423a and 423b manipulated to receive a control command. The user input units 423a and 423b may adopt any method if it is a tactile manner that a user manipulates touch and push with tactile feeling. In this drawing, the user input units 423a and 423b of a push and touch input method are equipped at the frame part and the control module 480, respectively.

Additionally, the glass-type terminal 400 may include a microphone (not shown) receiving sound and processing it electrical voice data and a sound output module 452 outputting sound. The sound output module 452 may be configured to deliver sound through a general sound output method or a bone conduction method. When the sound output module 452 is implemented with a bone conduction type and a user wears the glass-type terminal 400, the sound output module 452 closely contacts the head portion and delivers sound by vibrating the skull.

The glass-type terminal 400 may include a sensing unit 440. The sensing unit 440, as a configuration corresponding to the sensing unit 140 of the terminal 100, may include at least one sensor for sensing at least one of information in the glass-type terminal 400, information on an environment surrounding the glass-type terminal 400, and user information. For example, the sensing unit 440 may include at least one of a proximity sensor, an illumination sensor, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, a camera), a microphone, a battery gauge, an environmental sensor (for example, a barometer, a hygrometer, a thermometer, a radiation sensor, a thermal sensor, and a gas sensor), and a chemical sensor (for example, an electronic noise, a healthcare sensor, and a biometric sensor). Moreover, a terminal disclosed in this specification may combines information sensed by at least two or more sensors among such sensors and may then utilize it.

Moreover, the terminal 100 may include at least one vibration device 600 and may perform vibration on the basis of obtained movement data.

Hereinafter, this will be described in more detail.

Figure 4:
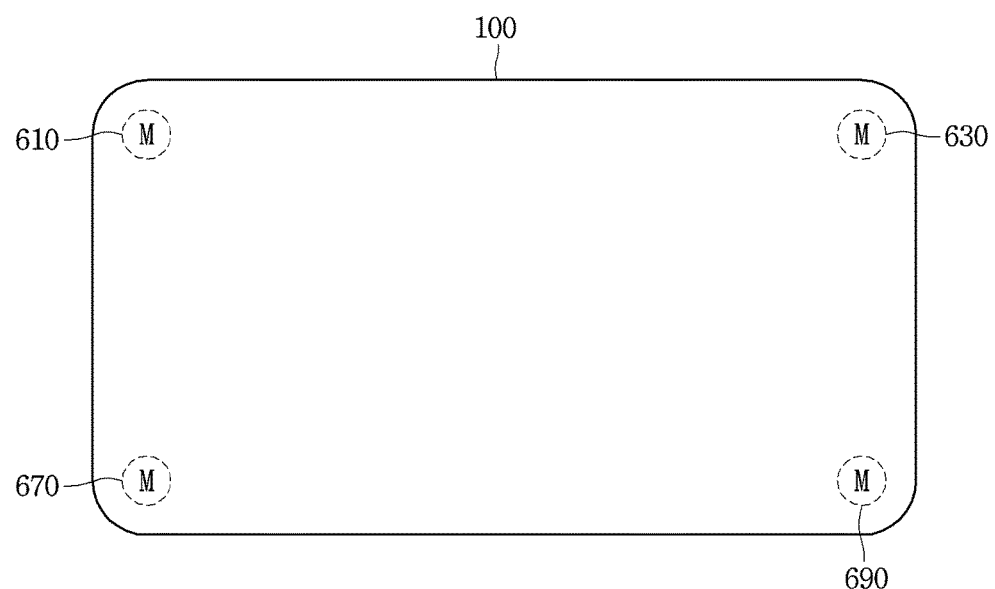
FIG. 4 is a view illustrating a vibration device arrangement according to an embodiment of the present invention.

FIG. 4 is a view illustrating a vibration device arrangement according to an embodiment of the present invention.

Figure 5:
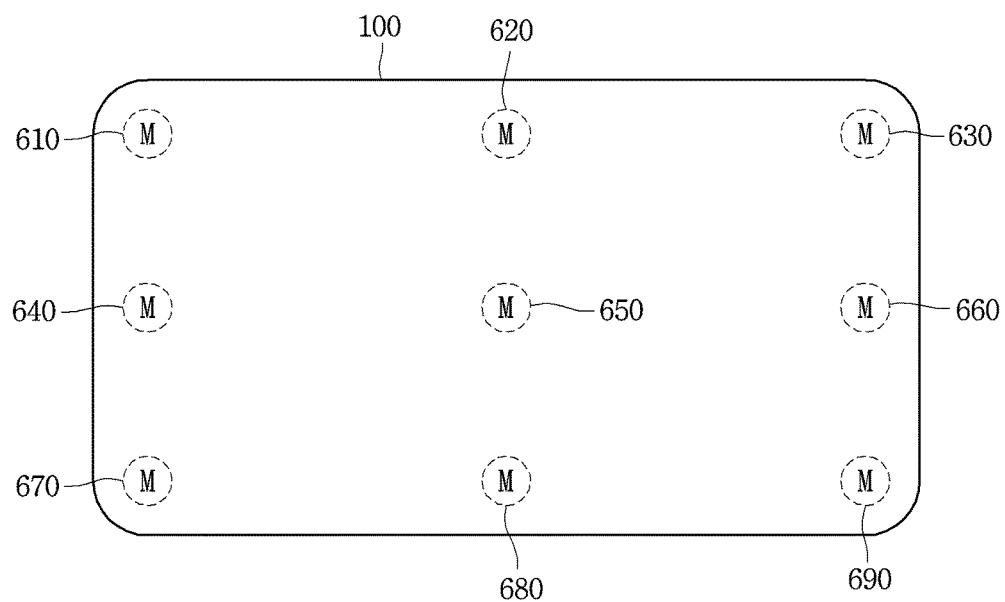
FIG. 5 is a view illustrating a vibration device arrangement according to another embodiment of the present invention.

FIG. 5 is a view illustrating a vibration device arrangement according to another embodiment of the present invention.

Moreover, the terminal 100 may include a plurality of vibration devices 600. For example, referring to FIG. 4, the terminal 100 may include a plurality of vibration devices 610, 630, 670, and 690 on the edges of the terminal 100, respectively. As another example, referring to FIG. 5, the terminal 100 may include a plurality of vibration devices 610, 620, 630, 640, 650, 660, 670, 680, and 690 at predetermined intervals or distances of the terminal 100.

The present invention is not limited to the descriptions for the plurality of vibration devices 600 equipped in the terminal 100. Accordingly, the plurality of vibration devices 600 may be equipped variously according to a user's or designer's selection. Hereinafter, for convenience of description, a case that the terminal 100 includes four vibration devices 610, 630, 670, and 690 is described.

Moreover, the terminal 100 may perform a vibration operation corresponding to the obtained movement data. In more detail, the terminal 100 may perform a vibration operation corresponding to the movement data obtained through at least one equipped vibration device 600.

For example, the terminal 100 may obtain the movement data of the watch-type terminal 300 and may perform a vibration operation corresponding to the obtained movement data.

This will be described with reference to FIGS. 6 to 11.

FIG. 6 is a view illustrating a vibration operation of a terminal 100 according to an embodiment of the present invention.

Referring to FIG. 6, when obtaining the movement data on a movement to the right from a watch-type terminal 300, the terminal 100 may allow a plurality of vibration devices 610, 630, 670, and 690 to vibrate on the basis of the obtained movement data. Accordingly, a user may detect a vibration from each of a plurality of points 701, 702, and 703 on the terminal 100. Then, each vibration detected from the plurality of points 701, 702, and 703 by a user may be detected sequentially in the order of the first point 701, the second point 702, and the third point 703. Additionally, a vibration detected from the first point 701 may have a first size, a vibration detected from the second point 702 may have a second size, and a vibration detected from the third point 703 may have a third size.

FIG. 7 is a view illustrating a vibration operation of a terminal 100 according to another embodiment of the present invention.

Referring to FIG. 7, when obtaining the movement data on a movement to the left from a watch-type terminal 300, the terminal 100 may allow a plurality of vibration devices 610, 630, 670, and 690 to vibrate on the basis of the obtained movement data. Accordingly, a user may detect a vibration from each of a plurality of points 704, 705, and 706 on the terminal 100. Then, each vibration detected from the plurality of points 704, 705, and 706 by a user may be detected sequentially in the order of the first point 704, the second point 705, and the third point 706. Additionally, a vibration detected from the first point 704 may have a first size, a vibration detected from the second point 705 may have a second size, and a vibration detected from the third point 706 may have a third size.

FIG. 8 is a view illustrating a vibration operation of a terminal 100 according to another embodiment of the present invention.

Referring to FIG. 8, when obtaining the movement data on a movement to the top from a watch-type terminal 300, the terminal 100 may allow a plurality of vibration devices 610, 630, 670, and 690 to vibrate on the basis of the obtained movement data. Accordingly, a user may detect a vibration from each of a plurality of points 707, 708, and 709 on the terminal 100. Then, each vibration detected from the plurality of points 707, 708, and 709 by a user may be detected sequentially in the order of the first point 707, the second point 708, and the third point 709. Additionally, a vibration detected from the first point 707 may have a first size, a vibration detected from the second point 708 may have a second size, and a vibration detected from the third point 709 may have a third size.

FIG. 9 is a view illustrating a vibration operation of a terminal 100 according to another embodiment of the present invention.

Referring to FIG. 9, when obtaining the movement data on a movement to the bottom from a watch-type terminal 300, the terminal 100 may allow a plurality of vibration devices 610, 630, 670, and 690 to vibrate on the basis of the obtained movement data. Accordingly, a user may detect a vibration from each of a plurality of points 710, 711, and 712 on the terminal 100. Then, each vibration detected from the plurality of points 710, 711, and 712 by a user may be detected sequentially in the order of the first point 710, the second point 711, and the third point 712. Additionally, a vibration detected from the first point 710 may have a first size, a vibration detected from the second point 711 may have a second size, and a vibration detected from the third point 712 may have a third size.

FIG. 10 is a view illustrating a vibration operation of a terminal 100 according to another embodiment of the present invention.

Referring to FIG. 10, when obtaining the movement data on a movement to a user direction from a watch-type terminal 300, the terminal 100 may allow a plurality of vibration devices 610, 630, 670, and 690 to vibrate on the basis of the obtained movement data. Accordingly, a user may detect a vibration from a specific point 713 on the terminal 100. Then, a vibration detected from the specific point 713 by a user may be a vibration in which an area where vibration is detected becomes greater.

Figure 11:
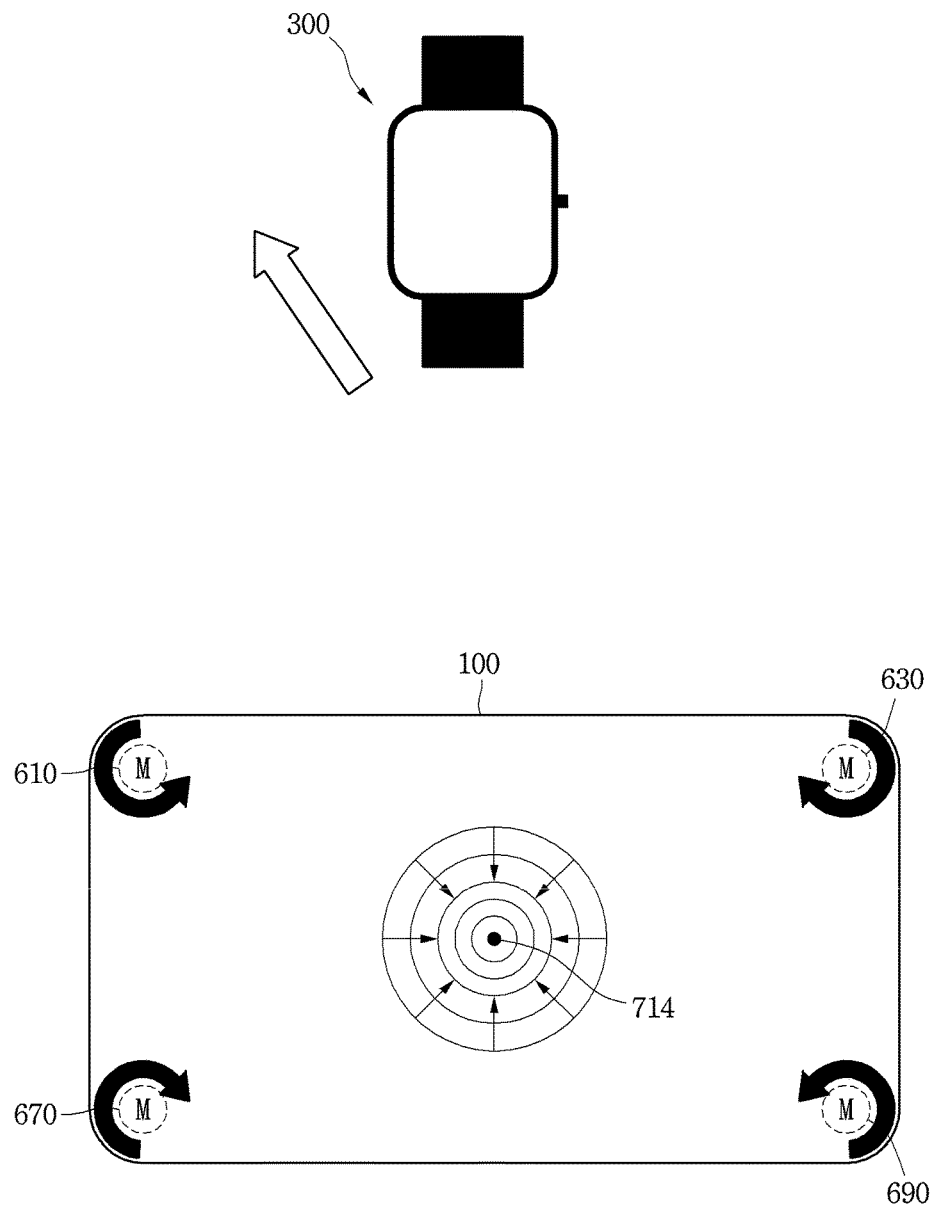
FIG. 11 is a view illustrating a vibration operation of a terminal according to another embodiment of the present invention.

FIG. 11 is a view illustrating a vibration operation of a terminal 100 according to another embodiment of the present invention.

Referring to FIG. 11, when obtaining the movement data on a movement to a user opposite direction from a watch-type terminal 300, the terminal 100 may allow a plurality of vibration devices 610, 630, 670, and 690 to vibrate on the basis of the obtained movement data. Accordingly, a user may detect a vibration from a specific point 714 on the terminal 100. Then, a vibration detected from the specific point 714 by a user may be a vibration in which an area where vibration is detected becomes less.

Moreover, the terminal 100 may perform a vibration operation in various vibration patterns corresponding to the obtained movement data.

This will be described with reference to FIGS. 12 and 15.

FIGS. 12 to 15 are views illustrating various vibration pattern operations according to an embodiment of the present invention.

Figure 12:
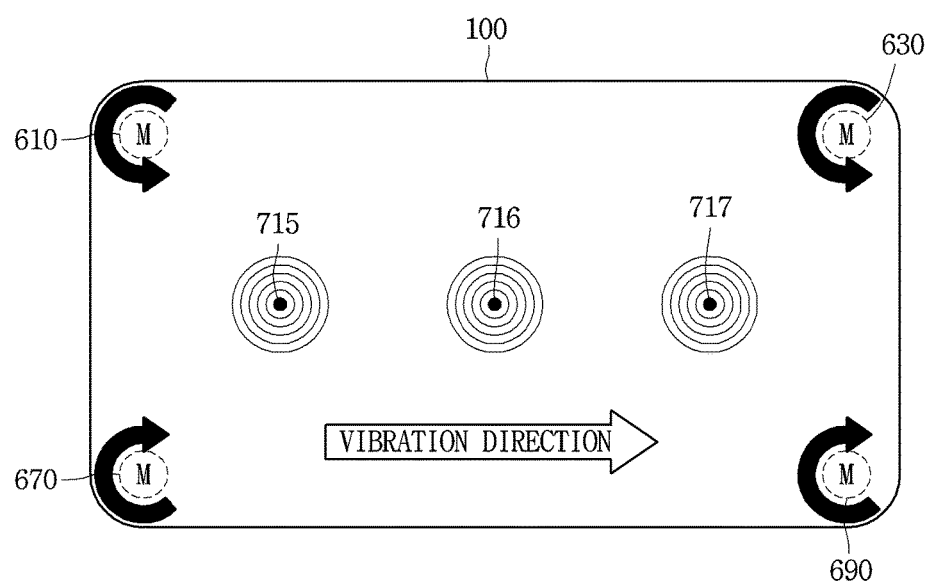
FIGS. 12 to 15 are views illustrating various vibration pattern operations according to an embodiment of the present invention.

Referring to FIG. 12, when obtaining the movement data on a movement to the right from a watch-type terminal 300, the terminal 100 may allow a plurality of vibration devices 610, 630, 670, and 690 to vibrate on the basis of the obtained movement data. Accordingly, a user may detect a vibration from each of a plurality of points 715, 716, and 717 on the terminal 100. Then, each vibration detected from the plurality of points 715, 716, and 717 by a user may be detected sequentially in the order of the first point 715, the second point 716, and the third point 717. Herein, vibrations detected from each of the plurality of points 715, 716, and 717 may have the same size.

Figure 13:
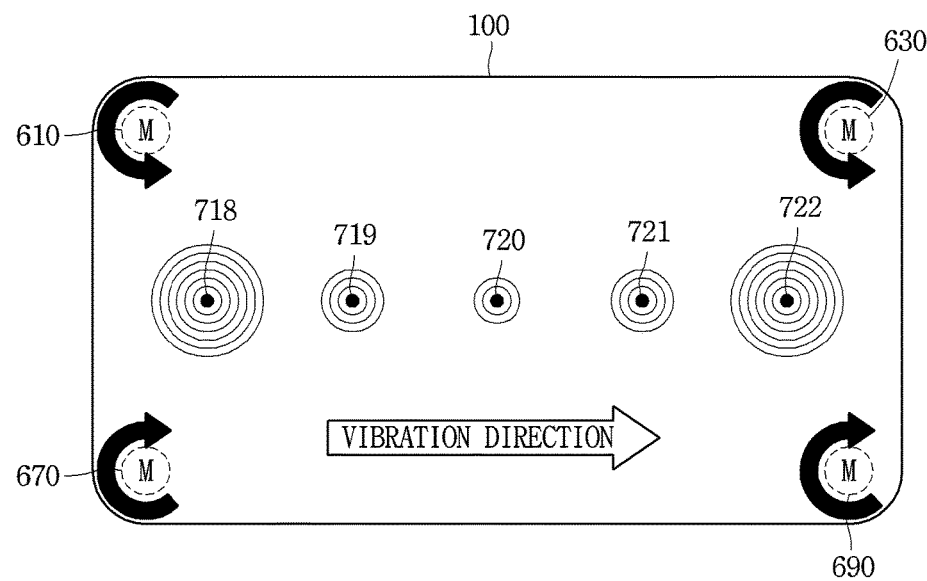

Referring to FIG. 13, when obtaining the movement data on a movement to the right from a watch-type terminal 300, the terminal 100 may allow a plurality of vibration devices 610, 630, 670, and 690 to vibrate on the basis of the obtained movement data. Accordingly, a user may detect a vibration from each of a plurality of points 718, 719, 720, 721, and 722 on the terminal 100. Then, each vibration detected from the plurality of points 718, 719, 720, 721, and 722 by a user may be detected sequentially in the order of the first point 718, the second point 719, the third point 720, the fourth point 721, and the fifth point 722. Herein, vibrations detected from each of the plurality of points 718, 719, 720, 721, and 722 may have the same size. Additionally, a vibration detected from the first point 718 may have a fifth size, a vibration detected from the second point 719 may have a third size, a vibration detected from the third point 720 may have a first size, a vibration detected from the fourth point 721 may have a third size, and a vibration detected from the fifth point 722 may have a fifth size.

Figure 14:
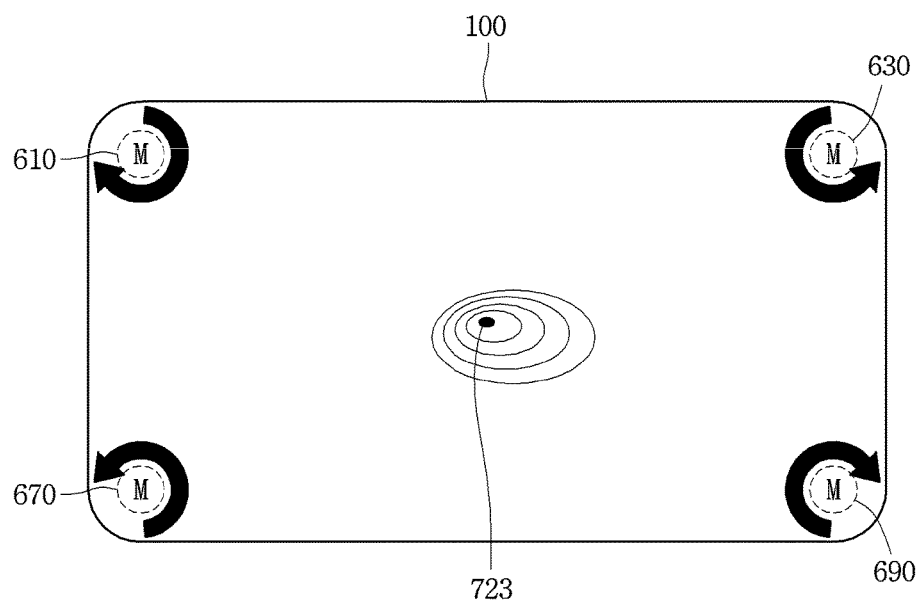

Referring to FIG. 14, the terminal 100 may allow a plurality of vibration devices 610, 630, 670, and 690 to vibrate on the basis of movement data obtained from the watch-type terminal 300. Accordingly, a user may detect a vibration from a specific point 723 on the terminal 100. Then, a vibration detected from the specific point 723 by a user may be a first pattern vibration in which an area where vibration is detected becomes greater asymmetrically.

Figure 15:
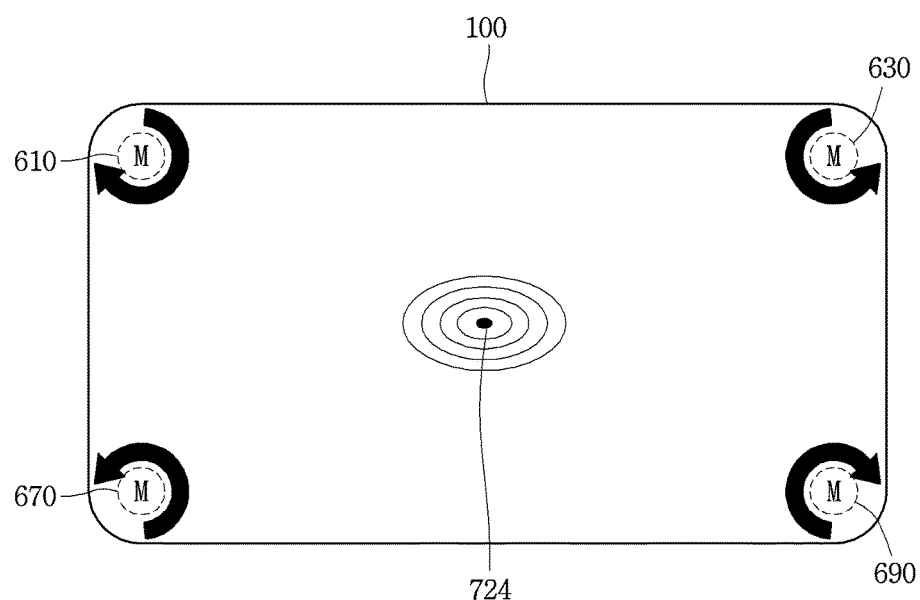

Referring to FIG. 15, the terminal 100 may allow a plurality of vibration devices 610, 630, 670, and 690 to vibrate on the basis of movement data obtained from the watch-type terminal 300. Accordingly, a user may detect a vibration from a specific point 724 on the terminal 100. Then, a vibration detected from the specific point 724 by a user may be a first pattern vibration in which an area where vibration is detected becomes greater asymmetrically.

The above-mentioned various vibration operations of the terminal 100 are examples for describing a vibration operation corresponding to the obtained movement data and thus the present invention is not limited thereto. Accordingly, various vibration operations may be performed according to a user's or designer's selection. Accordingly, the terminal 100 may operate in a curve form vibration pattern in addition to a linear form vibration pattern.

Contents on a movement detection of a terminal and a vibration operation of a terminal are described on the basis of the above-mentioned contents.

Figure 16:
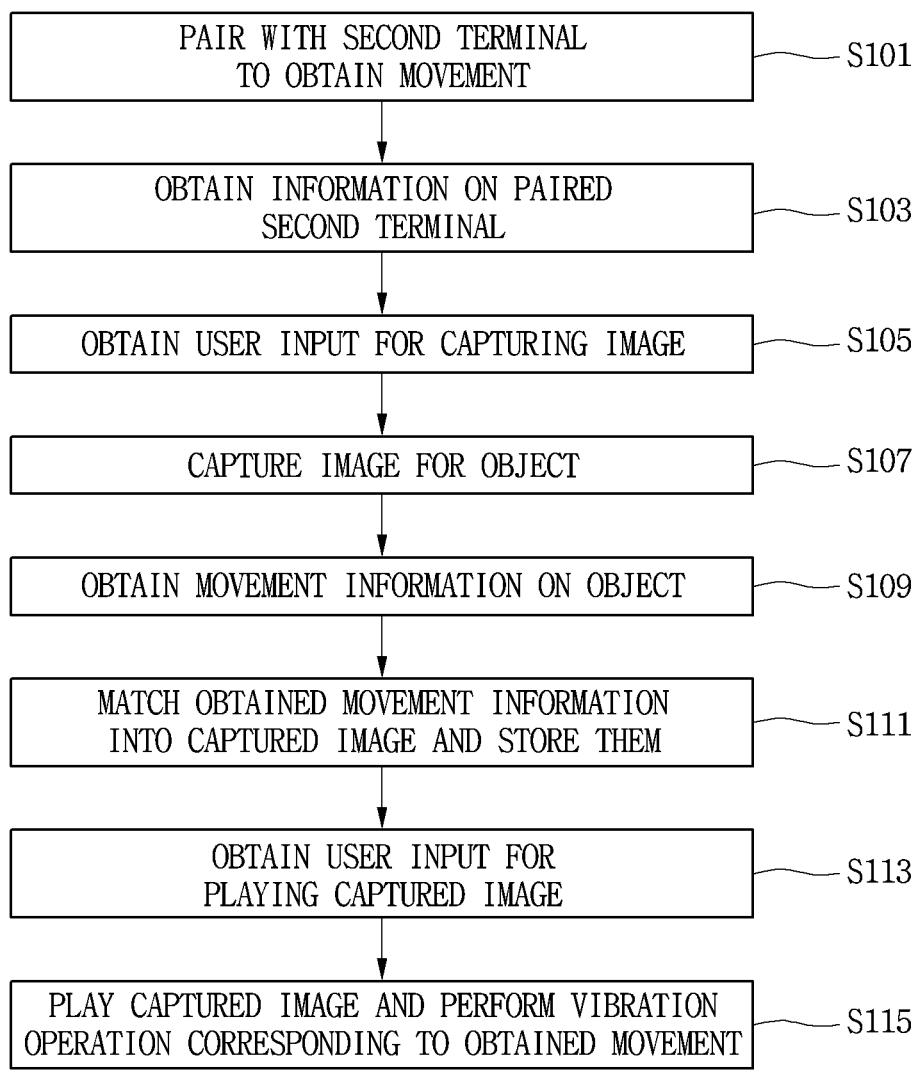
FIG. 16 is a flowchart illustrating an operating method of a terminal according to an embodiment of the present invention.

FIG. 16 is a flowchart illustrating an operating method of a terminal according to an embodiment of the present invention.

Referring to FIG. 16, the terminal 100 is paired with a terminal for obtaining movement in operation S101.

Hereinafter, the terminal 100 capturing an image may be expressed as a first terminal and a terminal obtaining a movement of an object may be expressed as a second terminal. Then, the second terminal may be a terminal 100 different from the terminal 100 capturing an image, a watch-type terminal 300, a glass-type terminal 400, and a band-type terminal (not shown). For easiness of description, although the second terminal is described as the watch-type terminal 300, it is not limited to the watch-type terminal 300.

The control unit 180 of the terminal 100 may be paired with the watch-type terminal 300 (that is, the second terminal) to obtain a movement through the wireless communication unit 110.

As an embodiment, the control unit 180 may be paired with the watch-type terminal 300 through a tagging operation with an NFC module (not shown) included in the watch-type terminal 300 by using an NFC module (not shown) included in the wireless communication unit 110.

As another embodiment, the control unit 180 may recognize an operation (for example, the watch-type terminal 300 emits light with at least one of a specific pattern, a specific color, and a specific brightness through at least one of the display unit 351 and a light emitting unit (not shown)) through the camera 121 and may then be paired with the watch-type terminal 300.

In such a way, the control unit 180 may be paired with the control unit 380 of the watch-type terminal 300 within a predetermined area. Since content on pairing relates to a known technique, detailed description thereof will be omitted.

The control unit 180 of the terminal 100 obtains information on the paired second terminal in operation S103.

The control unit 180 may transmit/receive various data to/from the paired second terminal and may obtain information necessary for performing various operations.

As an embodiment, the control unit 180 may obtain information on the watch-type terminal 300 from the control unit 380 of the watch-type terminal 300 that is the paired second terminal.

As an embodiment, the control unit 180 may obtain information on the watch-type terminal 300 stored in the memory 160 based on a signal received from the watch-type terminal 300 that is the paired second terminal.

As another embodiment, the control unit 180 may obtain information on the watch-type terminal 300 from a server (not shown) on the basis of a signal received from the watch-type terminal 300 that is the second terminal.

The control unit 180 may transmit/receive various data to/from the second terminal and may control the second terminal on the basis of the obtained information on the second terminal.

The control unit 180 of the terminal 100 obtains a user input for capturing an image in operation S105.

The control unit 180 may receive a user input for capturing an image through at least one of the user input unit 130 and the touch sensor 144.

The control unit 180 of the terminal 100 captures an image of an object on the basis of the obtained user input in operation S107.

The control unit 180 may capture an image of an object through the camera 121. Herein, the object may be a user wearing or carrying the second terminal. Additionally, the object may be at least one object or user. Accordingly, the object of a captured image may be a plurality of objects or users.

The control unit 180 of the terminal 100 obtains movement information on the object of the captured image in operation S109.

The control unit 180 may obtain movement information on at least one object of an image captured through the camera 121. The control unit 180 may obtain movement information on an object through at least one of movement data obtained from the second terminal, focus data on an object, image processing data for an obtained image.

As an embodiment, the control unit 180 may obtain movement information on an object by receiving movement data from the second terminal. In more detail, the control unit 180 may obtain movement information on an object that the second terminal obtains from at least one of another terminal 100 that is the second terminal, a watch-type terminal 300, and a glass-type terminal 400. At this point, the control unit 180 may transmit a movement detection operation signal for detecting a movement to the second terminal through the wireless communication unit 110. This will be described with reference to FIGS. 16 and 19.

FIGS. 17 to 20 are views illustrating a movement data acquisition of an object according to an embodiment of the present invention.

Referring to FIG. 17, the control unit 180 may obtain an image for a user wearing the watch-type terminal 300 through the camera 121. The control unit 180 may display a captured image on the display unit 151 and may display an REC display 510 representing the capturing on the display unit 151. The control unit 180 may obtain movement data of a user from the watch-type terminal 300 worn by the user that is the object of an obtained image.

The control unit 180 may obtain movement data of an object from a plurality of second terminals.

The control unit 180 may obtain movement data of an object from a plurality of second terminals worn by one user. Referring to FIG. 18, the control unit 180 may obtain an image for a user wearing the watch-type terminal 300 through the camera 121. The control unit 180 may display a captured image on the display unit 151 and may display an REC display 510 representing the capturing on the display unit 151. The control unit 180 may obtain movement data of a user from a plurality of watch-type terminals 300 worn by the user that is the object of an obtained image.

Figure 19:
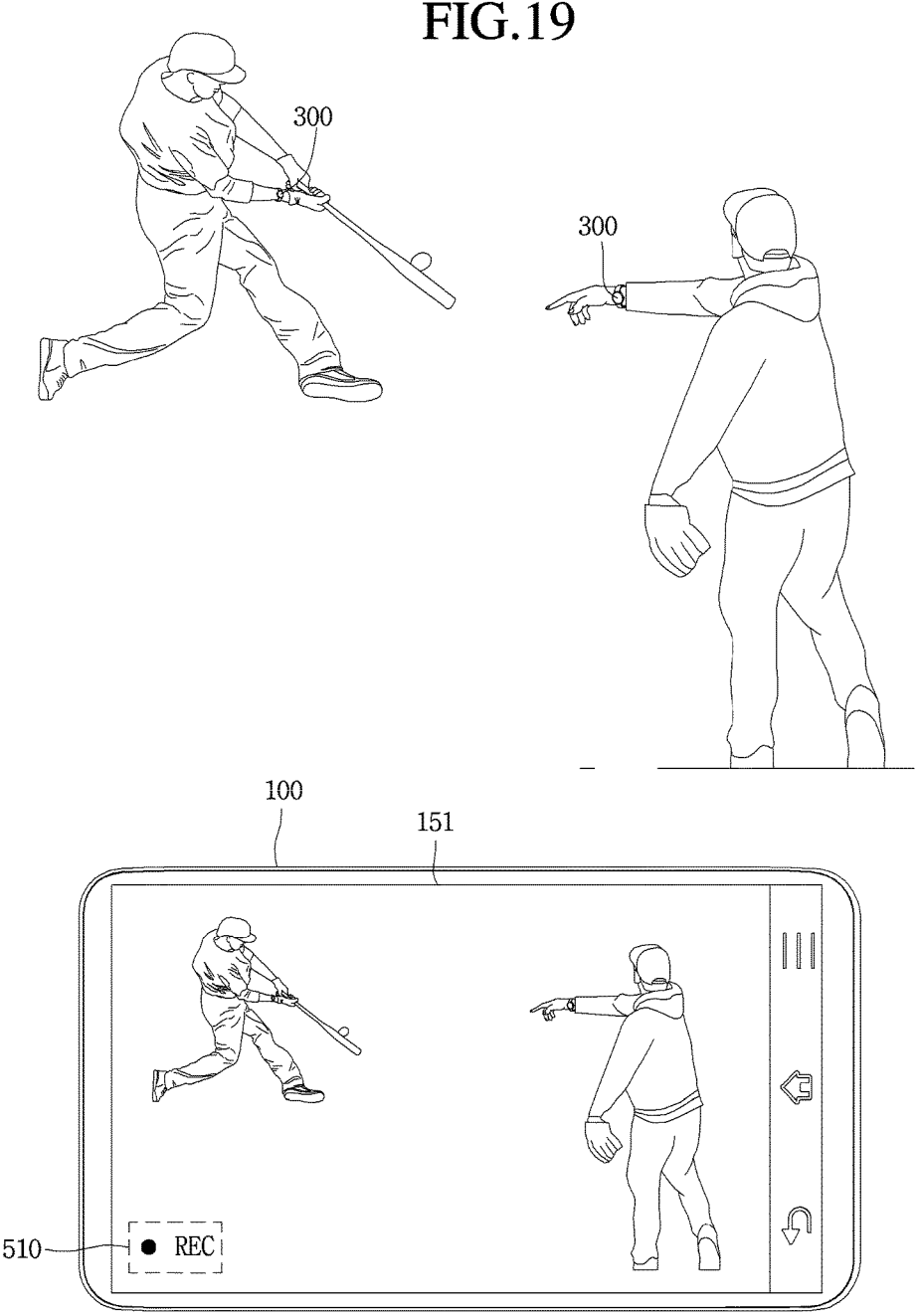

The control unit 180 may obtain movement data of an object from a plurality of second terminals worn by a plurality of users. Referring to FIG. 19, the control unit 180 may obtain an image for a plurality of users wearing the watch-type terminal 300 through the camera 121. The control unit 180 may display a captured image on the display unit 151 and may display an REC display 510 representing the capturing on the display unit 151. The control unit 180 may obtain movement data of each of a plurality of users from a plurality of watch-type terminals 300 respectively worn by the plurality of users that are the objects of an obtained image.

Additionally, the control unit 180 may obtain movement data for a related movement of a plurality of objects from a plurality of second terminals worn by a plurality of users, respectively. Referring to FIG. 20, the control unit 180 may obtain an image for a plurality of users wearing the watch-type terminal 300 through the camera 121. The control unit 180 may display a captured image on the display unit 151 and may display an REC display 510 representing the capturing on the display unit 151. The control unit 180 may obtain each movement data for related movements of a plurality of users from a plurality of watch-type terminals 300 respectively worn by the plurality of users that are the objects of an obtained image.

Content on obtaining movement information on an object by the second terminal will be described in the section on the second terminal.

As an embodiment, the control unit 180 may obtain movement information on an object by recognizing a marker 200 equipped in the second terminal. This will be described with reference to FIGS. 20 and 22.

Figure 21:
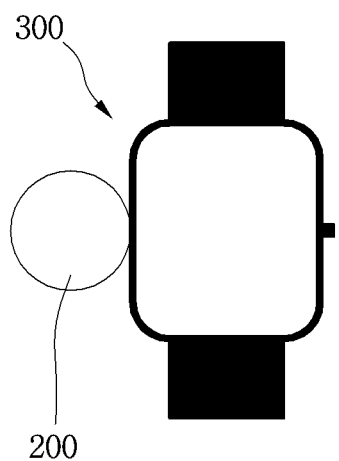
FIG. 21 is a view illustrating a marker and a terminal of a watch-type terminal including the maker.

FIG. 21 is a view illustrating a marker and a watch-type terminal including the maker according to an embodiment of the present invention.

Figure 22:
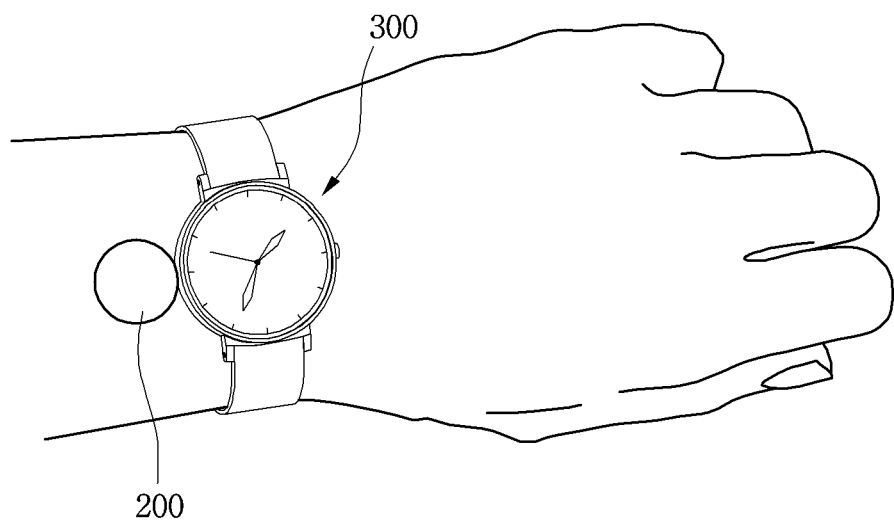
FIG. 22 is a view when a user wears a watch-type terminal including a marker maker according to an embodiment of the present invention.

FIG. 22 is a view when a user wears a watch-type terminal including a marker according to an embodiment of the present invention.

FIG. 23 is a view of obtaining an object movement through marker recognition according to an embodiment of the present invention.

Referring to FIG. 21, the watch-type terminal 300 may include a marker 200 recognizable by the control unit 180 of the terminal 100. The marker 200 may be equipped at one side or one flank of the watch-type terminal 300. Then, the marker 200 may be in a detachable form.

Referring to FIG. 22, a user may wear the watch-type terminal 300 including the maker 200. The marker 200 may be equipped at an appropriate position to allow a user to easily wear the watch-type terminal 300 including the marker 200.

Referring to FIG. 23, the control unit 180 may obtain an image for a user wearing the watch-type terminal 300 including the marker 200 through the camera 121. The control unit 180 may display a captured image on the display unit 151 and may display an REC display 510 representing the capturing on the display unit 151. Additionally, the control unit 180 may recognize a portion corresponding to the marker 200 from a captured image and may display a marker display 620 representing a portion corresponding to the marker 200. The control unit 180 may obtain movement information on a movement of a user wearing the watch-type terminal 300 including the marker 200 on the basis of the amount of change in a portion corresponding to the marker 200 recognized from the obtained image.

Description for movement information acquisition through the recognition of the marker 200 is exemplary and thus the present invention is not limited thereto. Accordingly, the form and position of the marker 200 may be configured variously according to a user's or designer's selection. Additionally, the marker 200 may be equipped at a terminal 100 other than the watch-type terminal 300 or the glass-type terminal 400.

Moreover, the control unit 180 may obtain movement information on an object on the basis of an image obtained through the camera 121. In more detail, the control unit 180 may recognize a portion corresponding to an object included in an obtained image and may obtain movement information on a movement of an object on the basis of the amount of change in a portion corresponding to the recognized object.

This will be described with reference to FIG. 24.

Figure 24:
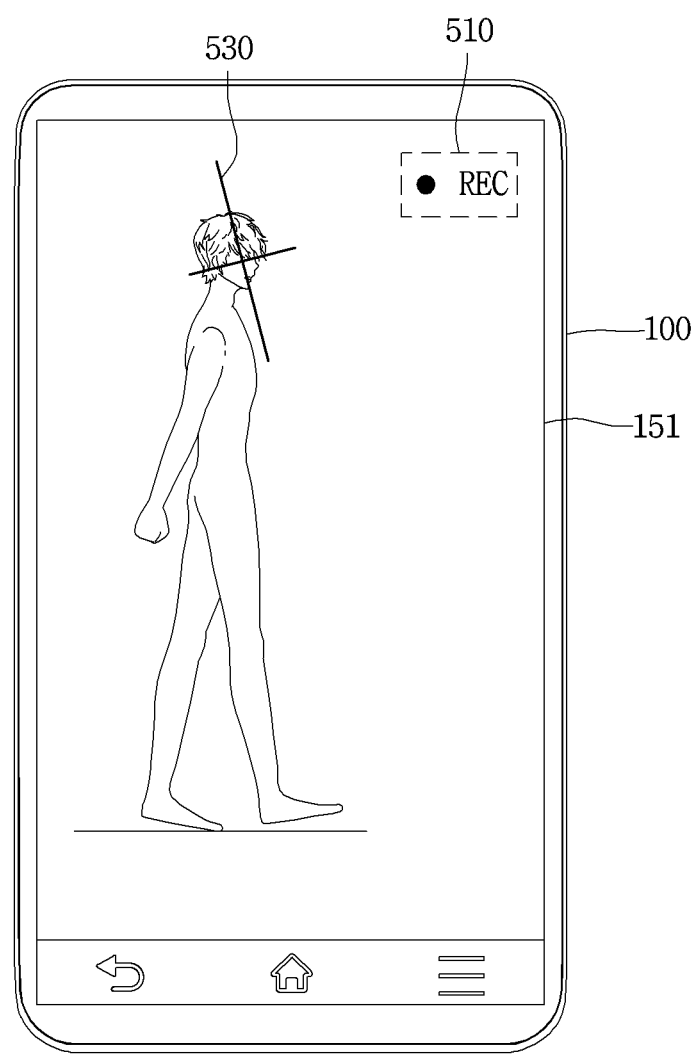
FIG. 24 is a view illustrating object recognition according to an embodiment of the present invention.

FIG. 24 is a view illustrating object recognition according to an embodiment of the present invention.

Referring to FIG. 24, the control unit 180 may obtain an image for a user that is an object through the camera 121. The control unit 180 may display a captured image on the display unit 151 and may display an REC display 510 representing the capturing on the display unit 151. Additionally, the control unit 180 may recognize a portion corresponding to a user that is an object or a body portion of a user from a captured image and may display a pointer 530 representing the recognized portion. The control unit 180 may obtain movement information on a movement of a user that is an object on the basis of the amount of change in a portion corresponding to the recognized point 530 recognized from an obtained image.

Additionally, the control unit 180 may focus on an object included in an obtained image and may obtain movement information on a movement of an object on the basis of the amount of change in the focused object. This will be described with reference to FIG. 25.

Figure 25:
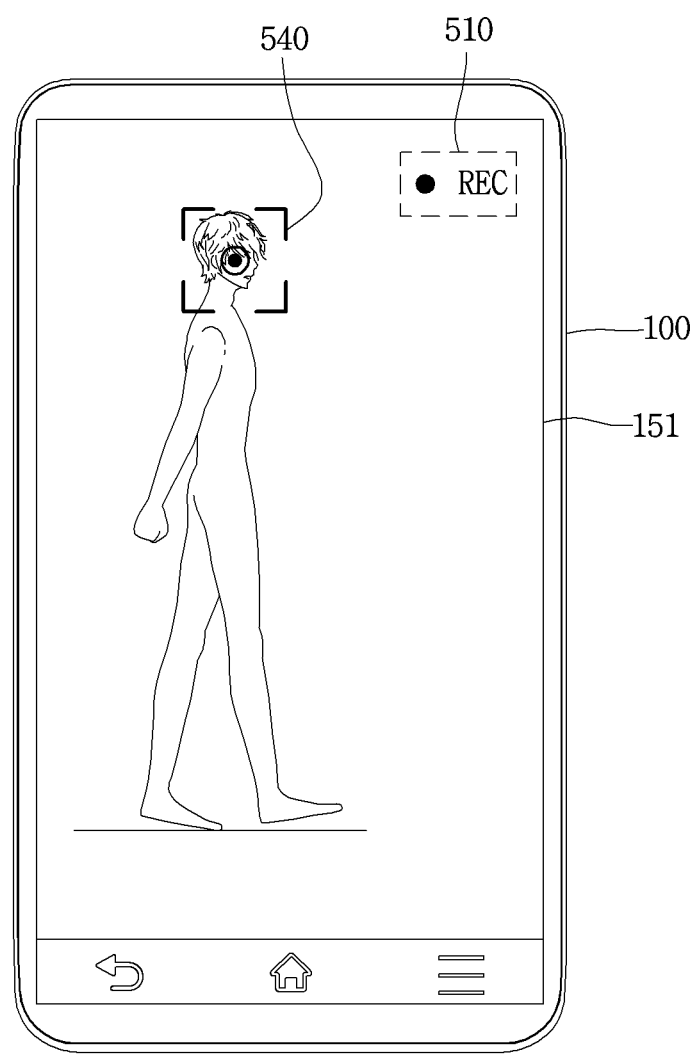
FIG. 25 is a view illustrating object focusing according to an embodiment of the present invention.

FIG. 25 is a view illustrating object focusing according to an embodiment of the present invention.

Referring to FIG. 25, the control unit 180 may obtain an image for a user that is an object through the camera 121. The control unit 180 may display a captured image on the display unit 151 and may display an REC display 510 representing the capturing on the display unit 151. Additionally, the control unit 180 may focus on a portion corresponding to a user that is an object or a body portion of a user from a captured image and may display a focus pointer 540 representing the focused portion. The control unit 180 may obtain movement information on a movement of a user that is an object on the basis of the amount of change in a portion corresponding to the focused point 540 recognized from an obtained image. Moreover, a focusing sensor focusing on a portion corresponding to a user that is an object or a body portion of a user may be included in the sensing unit 140 and may be configured with various sensors such as a laser sensor and an infrared sensor.

Description for movement information acquisition through the object recognition and focusing is exemplary and thus the present invention is not limited thereto. Accordingly, movement information on an object may be obtained by recognizing or focusing an object through various methods according to a user's or designer's selection.

Then, FIG. 16 will be referred.

The control unit 180 of the terminal 100 matches the obtained movement information to the captured image and stores them in operation S111.

The control unit 180 may match the obtained movement information to the captured image and may store them in the memory 160 or a linked server (not shown).

The control unit 180 of the terminal 100 obtains a user input for playing a captured image in operation S113.

The control unit 180 may obtain a user input for playing a captured image through at least one of the user input unit 130 and the touch sensor 144. Then, the captured image may be an image stored in the terminal 100 or an image obtained from at least one of another terminal and a server. Herein, a user input for playing a captured image may include a user input for playing a captured image and performing a vibration operation according to movement information corresponding to the played image.

The control unit 180 of the terminal 100 plays a captured image and performs a vibration operation according to movement information corresponding to the played image in operation S115.

The control unit 180 may play a captured image on the display unit 151 and may perform a vibration operation according to movement information corresponding to the played image through at least one vibration device 600. Herein, the movement information corresponding to the played image may be movement information obtained in operation S109. Then, the control unit 180 may perform a vibration operation only with respect to a movement of a predetermined standard in the obtained movement information. Additionally, the control unit 180 may adjust at least one of the intensity of a vibration operation and a vibration pattern in correspondence to the amount of change in an area corresponding to the object or a portion of the object of a played image.

This will be described with reference to FIGS. 26 to 30.

FIGS. 26 to 30 are views illustrating a captured image playback and a vibration operation according to an embodiment of the present invention.

Figure 26:
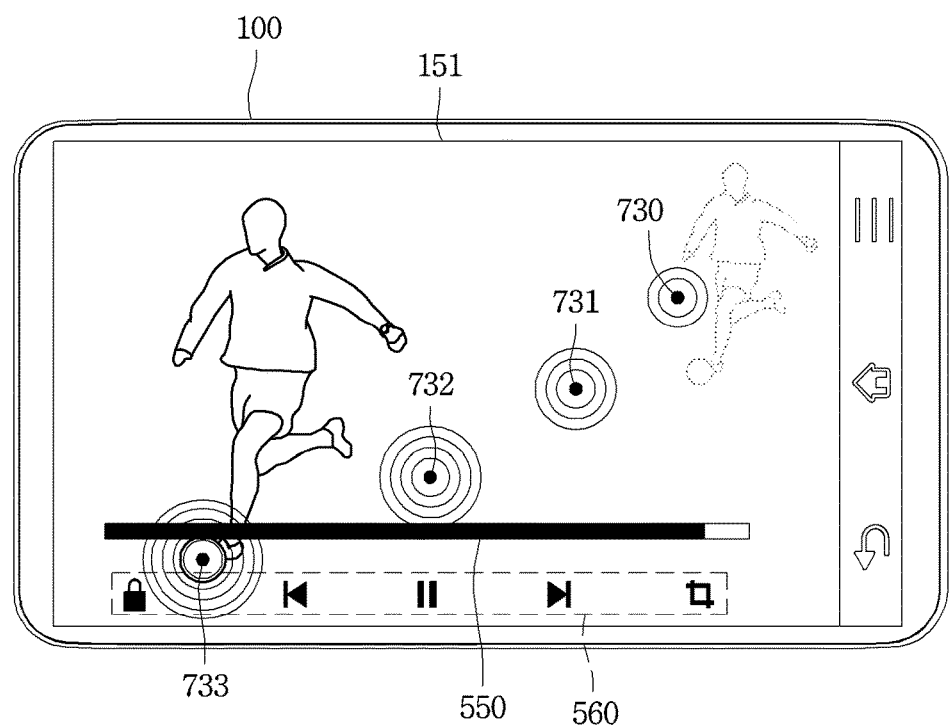
FIGS. 26 to 30 are views illustrating a captured image playback and a vibration operation according to an embodiment of the present invention.

Referring to FIG. 26, the control unit 180 may display an image obtained by capturing a scene of playing soccer on the display unit 151 and may display at least one of a progressive bar 550 for an image displayed in a partial area of the display unit 151 and a manipulation menu 560 for controlling an image playback. Then, the control unit 180 may perform a vibration operation according to movement information corresponding to an image played through at least one vibration device 600. Accordingly, the control unit 180 may control at least one vibration device 600 to allow each of a plurality of points 730, 731, 732, and 733 to vibrate sequentially in correspondence to a played image. Then, the control unit 180 may perform a control to allow a plurality of points 730, 731, 732, and 733 to operate with at least one of different vibration patterns and vibration intensities in correspondence to a played image. For example, the control unit 180 may perform a control in order for vibration in which the first point 730 has a first size, the second point 731 is a second size, the third point 732 has a third size, and the fourth point 733 has a fourth size. Additionally, the control unit 180 may perform a control so that the first to third points 730, 731, and 732 operate with a third pattern in which a vibrating area is constant and the fourth point 733 operates with a fourth pattern in which a vibrating area becomes greater constantly. Therefore, a user may detect a vibration from each of a plurality of points 730, 731, 732, and 733 on the terminal 100 in correspondence to a played image.

Figure 27:
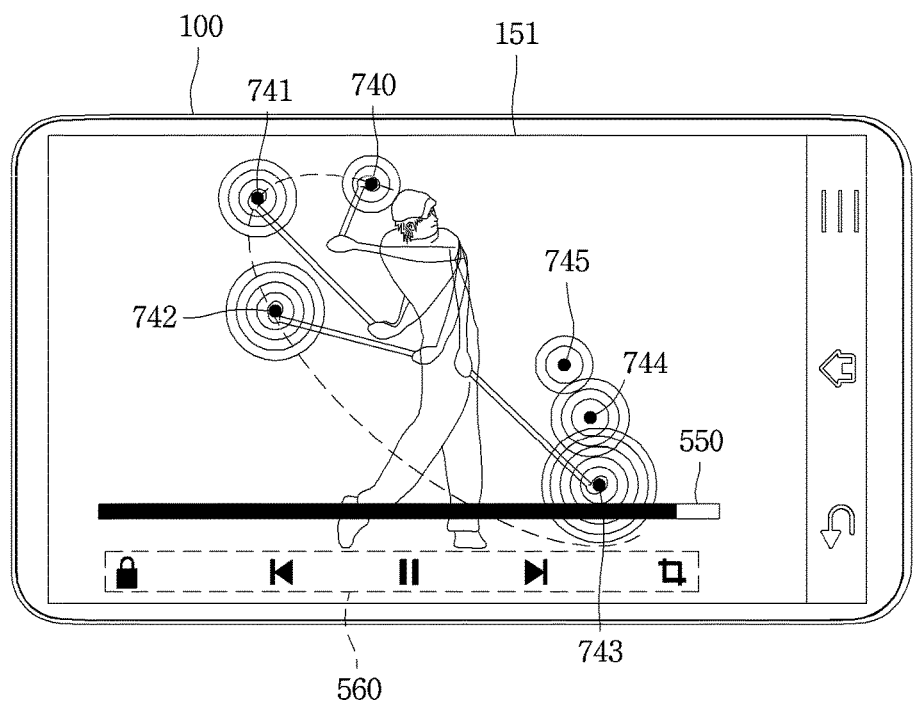

Referring to FIG. 27, the control unit 180 may display an image obtained by capturing a scene of golf swing on the display unit 151 and may display at least one of a progressive bar 550 for an image displayed in a partial area of the display unit 151 and a manipulation menu 560 for controlling an image playback. Then, the control unit 180 may perform a vibration operation according to movement information corresponding to an image played through at least one vibration device 600. Accordingly, the control unit 180 may control at least one vibration device 600 to allow each of a plurality of points 740, 741, 742, 743, 744, and 745 to vibrate sequentially in correspondence to a played image. Then, the control unit 180 may perform a control to allow a plurality of points 740, 741, 742, 743, 744, and 745 to operate with at least one of different vibration patterns and vibration intensities in correspondence to a played image.

For example, the control unit 180 may perform a control in order for vibration in which the first point 740 has a first size, the second point 741 has a second size, the third point 742 has a third size, the fourth point 743 has a fourth size, a fifth point 744 has a second size, and a sixth point 745 has a first size. Additionally, the control unit 180 may perform a control so that the first to third points and the fifth and sixth points 740, 741, 742, 744, 745 operate with a third pattern in which a vibrating area is constant and the fourth point 743 operates with a fourth pattern in which a vibrating area becomes greater constantly. Therefore, a user may detect a vibration from each of a plurality of points 740, 741, 742, 743, 744, and 745 on the terminal 100 in correspondence to a played image.

Figure 28:
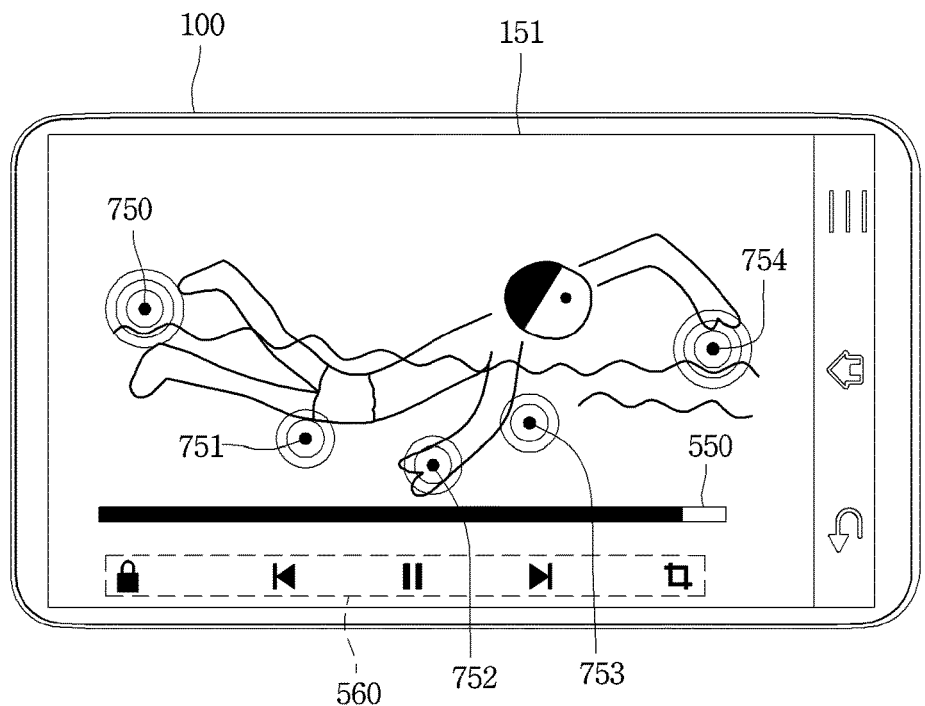

Referring to FIG. 28, the control unit 180 may display an image obtained by capturing a scene of swimming on the display unit 151 and may display at least one of a progressive bar 550 for an image displayed in a partial area of the display unit 151 and a manipulation menu 560 for controlling an image playback. Then, the control unit 180 may perform a vibration operation according to movement information corresponding to an image played through at least one vibration device 600. Accordingly, the control unit 180 may control at least one vibration device 600 to allow each of a plurality of points 750, 751, 752, 753, and 754 to vibrate sequentially in correspondence to a played image. Then, the control unit 180 may perform a control to allow a plurality of points 750, 751, 752, 753, and 754 to operate with at least one of different vibration patterns and vibration intensities in correspondence to a played image. For example, the control unit 180 may perform a control in order for vibration in which the first point and the fifth point 750 and 754 have a third size and the second point to the fourth point 751, 752, and 753 have a second size. Additionally, the control unit 180 may perform a control in order for vibration so that the first point and the fifth point 750 and 754 operate with a fifth pattern in which a vibrating area is irregular and the second point to the fourth point 751, 752, and 753 operate with a third pattern in which a vibrating area is constant. Therefore, a user may detect a vibration from each of a plurality of points 750, 751, 752, 753, and 754 on the terminal 100 in correspondence to a played image.

Figure 29:
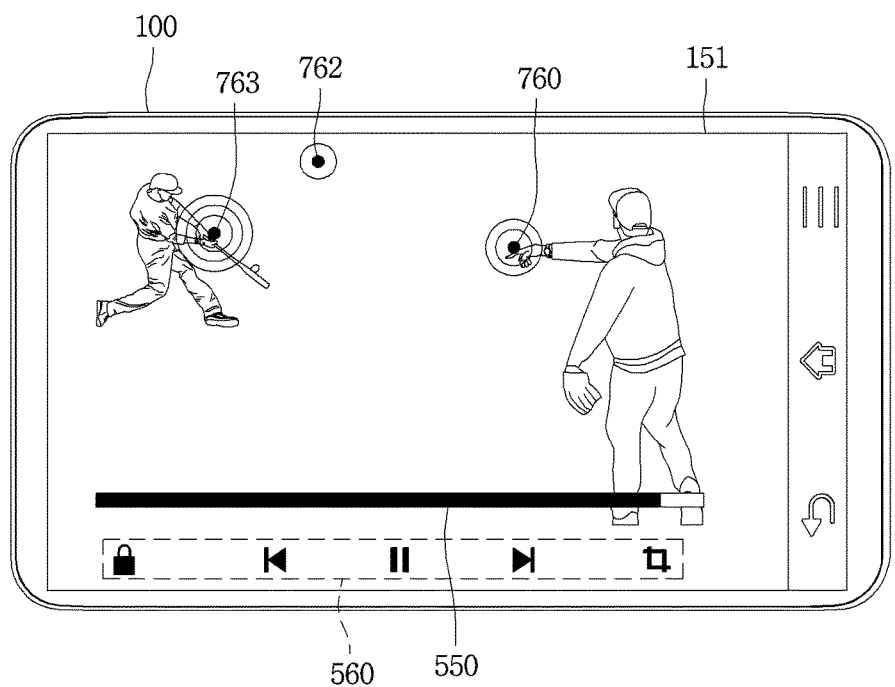

Referring to FIG. 29, the control unit 180 may display an image obtained by capturing a scene that two people play baseball on the display unit 151 and may display at least one of a progressive bar 550 for an image displayed in a partial area of the display unit 151 and a manipulation menu 560 for controlling an image playback. Then, the control unit 180 may perform a vibration operation according to movement information corresponding to an image played through at least one vibration device 600. Accordingly, the control unit 180 may control at least one vibration device 600 to allow each of a plurality of points 760, 761, 762, and 763 to vibrate sequentially in correspondence to a played image. Then, the control unit 180 may perform a control to allow a plurality of points 760, 761, 762, and 763 to operate with at least one of different vibration patterns and vibration intensities in correspondence to a played image. For example, the control unit 180 may perform a control in order for vibration in which the first point and the fourth point 760 and 763 have a third size, the second point 761 has a second size, and the third point 762 has a first size. Additionally, the control unit 180 may perform a control so that the first to third points 760, 761, and 762 have a third pattern in which a vibrating area is constant and the fourth point 763 has a fourth pattern in which vibrating area becomes greater constantly. Therefore, a user may detect a vibration from each of a plurality of points 760, 761, 762, and 763 on the terminal 100 in correspondence to a played image.

Figure 30:
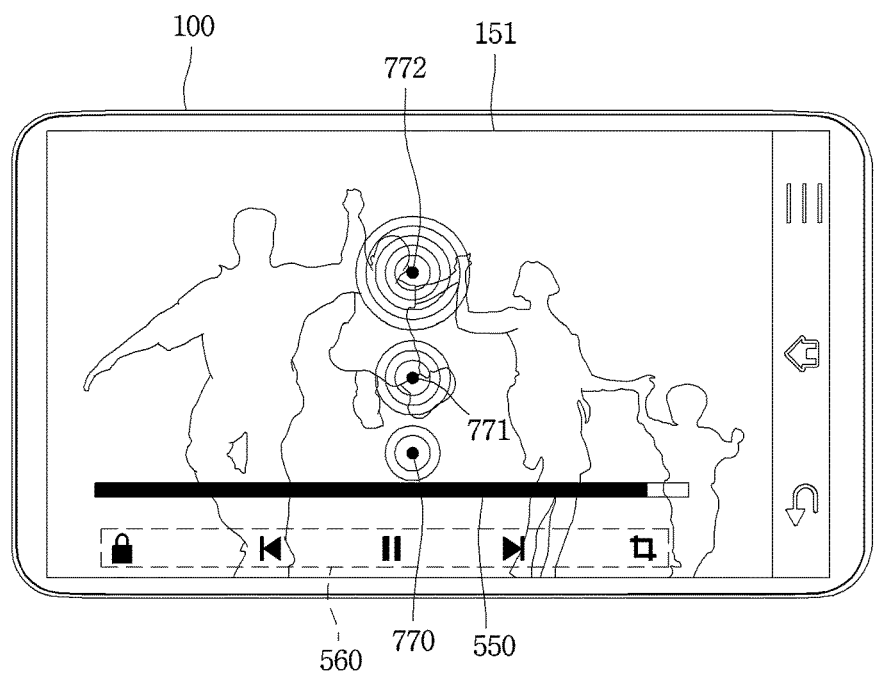

Referring to FIG. 30, the control unit 180 may display an image obtained by capturing a scene that a plurality of peoples hold hands each other and jump on the display unit 151 and may display at least one of a progressive bar 550 for an image displayed in a partial area of the display unit 151 and a manipulation menu 560 for controlling an image playback. Then, the control unit 180 may perform a vibration operation according to movement information corresponding to an image played through at least one vibration device 600. Accordingly, the control unit 180 may control at least one vibration device 600 to allow each of a plurality of points 770, 771, and 772 to vibrate sequentially in correspondence to a played image. Then, the control unit 180 may perform a control to allow a plurality of points 770, 771, and 772 to operate with at least one of different vibration patterns and vibration intensities in correspondence to a played image. For example, the control unit 180 may perform a control in order for vibration in which the first point 770 has a second size, the second point 771 has a third size, and the third point 772 has a fourth size. Additionally, the control unit 180 may perform a control in order for an operation with a first pattern in which vibrating areas of the first to the third points 770, 771, and 772 become greater asymmetrically in one direction. The one direction of the first pattern may be an upper direction according to movement information corresponding to a played image. Therefore, a user may detect a vibration from each of a plurality of points 770, 771, and 772 on the terminal 100 in correspondence to a played image.

The present invention is not limited to the descriptions for an image playback of the terminal 100 and a vibration operation corresponding to a played image. Accordingly, a captured image may be played variously according to a user's or designer's selection and a vibration operation corresponding to a played image may be performed.

In such a way, the terminal 100 may obtain movement information on a captured object. Then, since the terminal 100 performs a vibration operation according to a movement corresponding to a played image during the captured image playback, it is possible to provide realistic images to a user. Additionally, since the terminal 100 provides a vibration operation with respect to a movement corresponding to a played image, it is possible to provide various indirect experiences to a user.

Hereinafter, an operation of a second terminal to obtain movement information on a movement of an object will be described. The second terminal may be a terminal 100 different from the terminal 100 capturing an image, a watch-type terminal 300, a glass-type terminal 400, and a band-type terminal (not shown). For easiness of description, although the second terminal is described as the watch-type terminal 300, it is not limited to the watch-type terminal 300.

Figure 31:
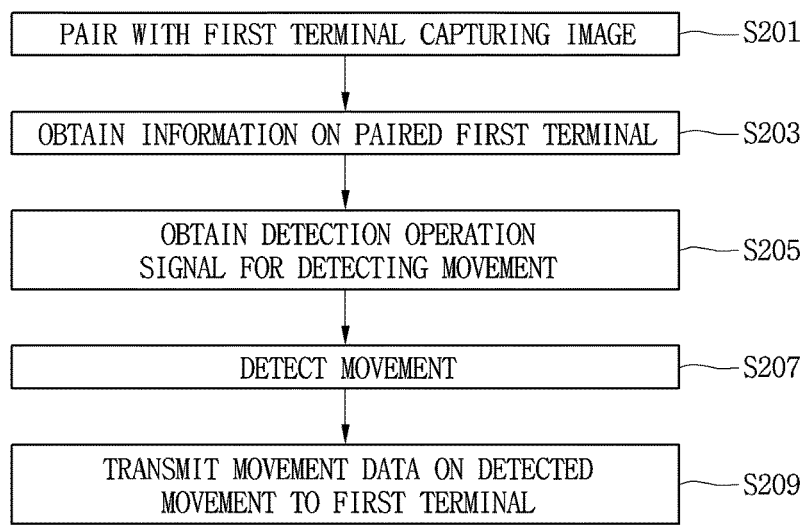
FIG. 31 is a flowchart illustrating an operating method of a terminal for obtaining movement information according to an embodiment of the present invention.

FIG. 31 is a flowchart illustrating an operating method of a terminal for obtaining movement information according to an embodiment of the present invention.

Referring to FIG. 31, the control unit 380 of the watch-type terminal 300 obtaining movement information on a movement of an object is paired with the terminal 100 capturing an image in operation S201.

The control unit 380 of the watch-type terminal 300 may be paired with the terminal 100 capturing an image through a wireless communication unit (not shown) of the watch-type terminal 300. Since a pairing technique between the watch-type terminal 300 and the terminal 100 is a well known technique, its detailed description is omitted.

The control unit 380 of the watch-type terminal 300 obtains information on the paired first terminal in operation S203.

The control unit 380 may transmit/receive various data to/from the terminal 100 that is the paired first terminal and may obtain information necessary for performing various operations.

As an embodiment, the control unit 380 may obtain information on the terminal 100 from the control unit 180 of the terminal 100 that is the paired first terminal.

As another embodiment, the control unit 380 may obtain information on the terminal 100 stored in a memory (not shown) on the basis of a signal received from the terminal 100 that is the first terminal.

As another embodiment, the control unit 380 may obtain information on the terminal 100 from a server (not shown) on the basis of a signal received from the terminal 100 that is the first terminal.

The control unit 380 may transmit/receive various data to/from the first terminal and may control the first terminal on the basis of the obtained information on the first terminal.

The control unit 380 of the watch-type terminal 300 obtains a detection operation signal for detecting a movement in operation S205.

The control unit 380 may obtain a detection operation signal for detecting a movement from the terminal 100 that is the first terminal. For example, the control unit 380 may obtain a detection operation signal for detecting a movement of a user wearing the watch-type terminal 300 from the terminal 100 capturing an image.

The control unit 380 of the watch-type terminal 300 detects a movement of a user wearing the watch-type terminal 300 in operation S207.

The control unit 380 of the watch-type terminal 300 detects a movement of a user by sensing at least one of the slope and acceleration of the watch-type terminal 300 through the sensing unit 340. Then, the control unit 380 may obtain movement data on the detected user's movement. This will be described with reference to FIGS. 31 to 37.

Figure 32:
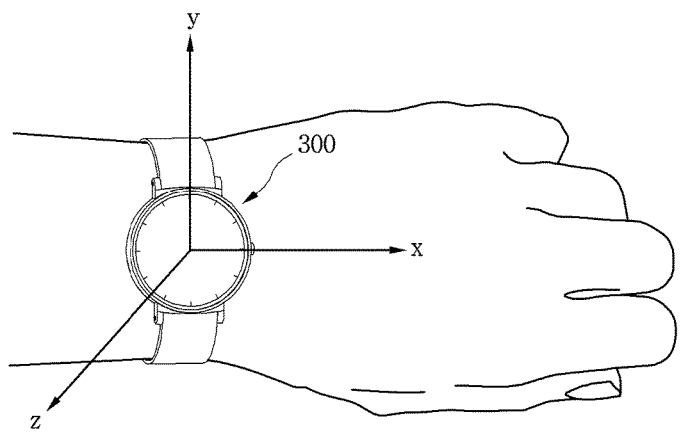
FIG. 32 is a view illustrating a movement detection axis of a watch-type terminal according to an embodiment of the present invention.

FIG. 32 is a view illustrating a movement detection axis of a watch-type terminal 300 according to an embodiment of the present invention.

Referring to FIG. 32, the watch-type terminal 300 may be worn on a wrist that is a body portion of a user. The watch-type terminal 300 may detect a user's movement with respect to each of the X-axis, Y-axis, and Z-axis directions. For example, the control unit 380 of the watch-type terminal 300 detects a movement of a user by sensing at least one of the slope and acceleration with respect to each of the X-axis, Y-axis, and Z-axis directions of the watch-type terminal 300 through the sensing unit 340.

FIGS. 33 to 38 are graphs for accelerations detected by a terminal according to an embodiment of the present invention.

Figure 33:
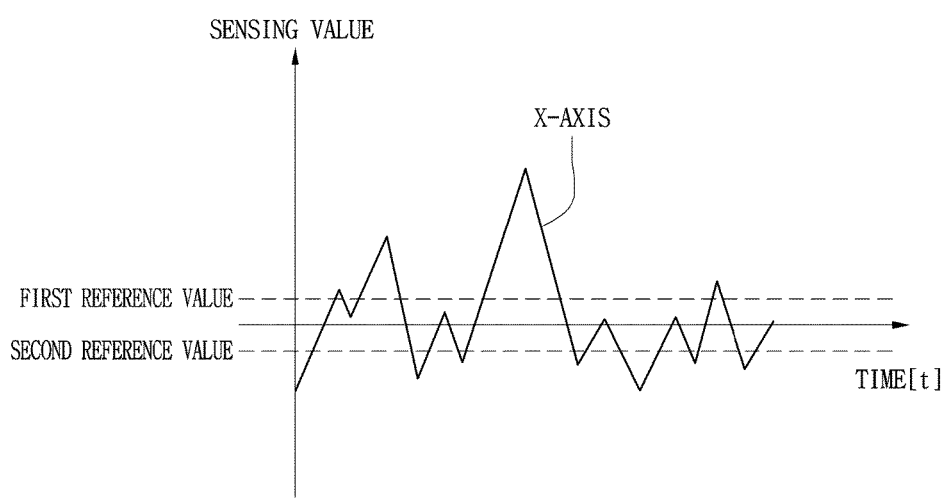
FIGS. 33 to 38 are graphs for accelerations detected by a terminal according to an embodiment of the present invention.

Referring to FIG. 33, the sensing unit 340 of the watch-type terminal 300 may detect a sensing value for acceleration in the X-axis direction of the watch-type terminal 300. Herein, the sensing value for acceleration in the X-axis direction may be a value for movement with respect to the left and right direction of the watch-type terminal 300. Then, the control unit 380 may detect a user's movement on the basis of the detected sensing value and may obtain movement data on the detected user's movement. Additionally, the control unit 380 may obtain a sensing value of more than a predetermined reference value as movement data on a user's movement. Accordingly, as shown in FIG. 33, the control unit 380 may obtain a sensing value of more than a first reference value or less than a second reference value as movement data on a user's movement.

Figure 34:
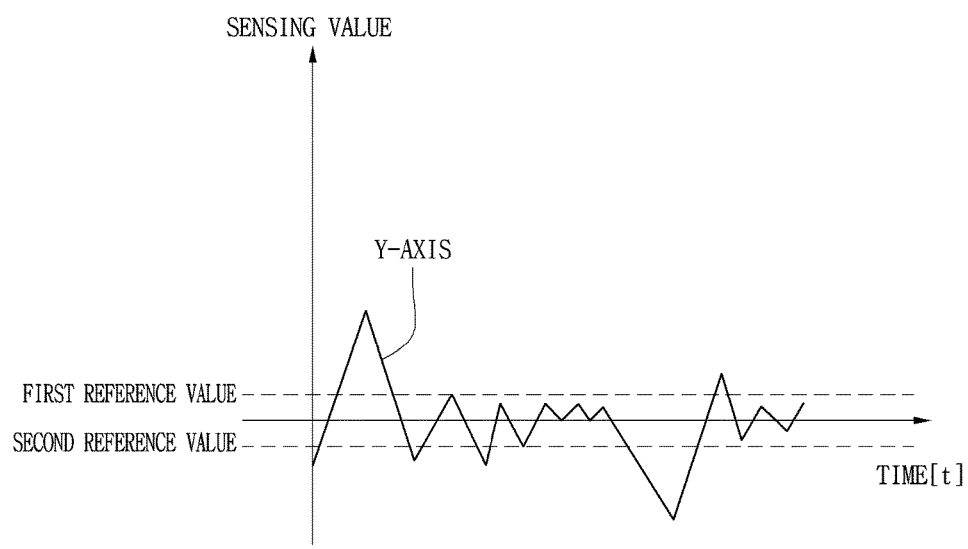

Referring to FIG. 34, the sensing unit 340 of the watch-type terminal 300 may detect a sensing value for acceleration in the Y-axis direction of the watch-type terminal 300. Herein, the sensing value for acceleration in the Y-axis direction may be a value for movement with respect to the up and down direction of the watch-type terminal 300. Then, the control unit 380 may detect a user's movement on the basis of the detected sensing value and may obtain movement data on the detected user's movement. Additionally, the control unit 380 may obtain a sensing value of more than a predetermined reference value as movement data on a user's movement. Accordingly, as shown in FIG. 34, the control unit 380 may obtain a sensing value of more than a first reference value or less than a second reference value as movement data on a user's movement.

Figure 35:
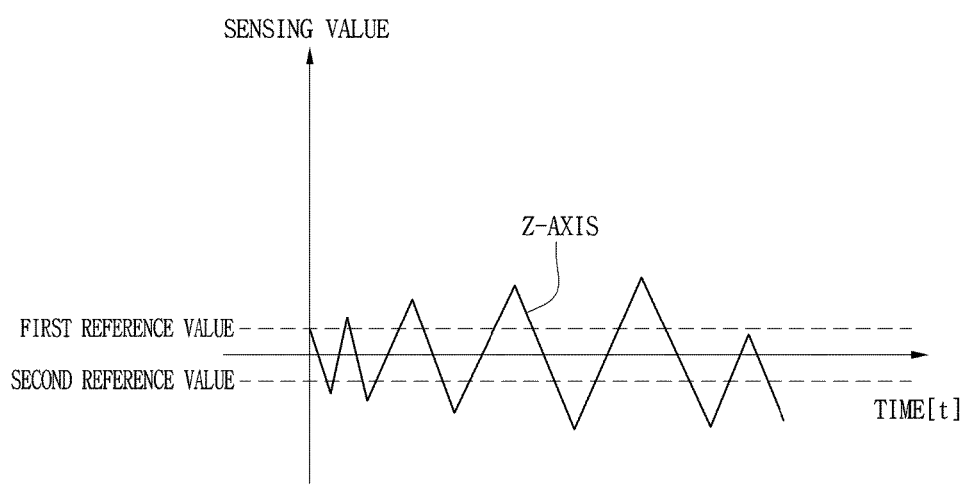

Referring to FIG. 35, the sensing unit 340 of the watch-type terminal 300 may detect a sensing value for acceleration in the Z-axis direction of the watch-type terminal 300. Herein, the sensing value for acceleration in the Z-axis direction may be a value for movement with respect to the forward and backward direction of the watch-type terminal 300. Then, the control unit 380 may detect a user's movement on the basis of the detected sensing value and may obtain movement data on the detected user's movement. Additionally, the control unit 380 may obtain a sensing value of more than a predetermined reference value as movement data on a user's movement. Accordingly, as shown in FIG. 35, the control unit 380 may obtain a sensing value of more than a first reference value or less than a second reference value as movement data on a user's movement.

Figure 36:
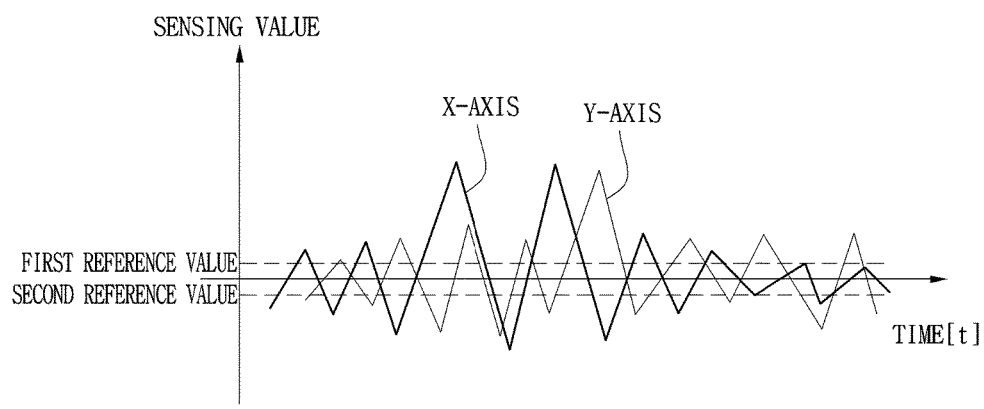

Referring to FIG. 36, the sensing unit 340 of the watch-type terminal 300 may detect sensing values for acceleration in the X-axis direction and the Y-axis direction of the watch-type terminal 300. Herein, the sensing values for acceleration in the X-axis direction and the Y-axis direction may be values for movement with respect to the diagonal direction of the watch-type terminal 300. Then, the control unit 380 may detect a user's movement on the basis of the detected sensing value and may obtain movement data on the detected user's movement. Additionally, the control unit 380 may obtain a sensing value of more than a predetermined reference value as movement data on a user's movement. Accordingly, as shown in FIG. 36, the control unit 380 may obtain a sensing value of more than a first reference value or less than a second reference value as movement data on a user's movement.

Figure 37:
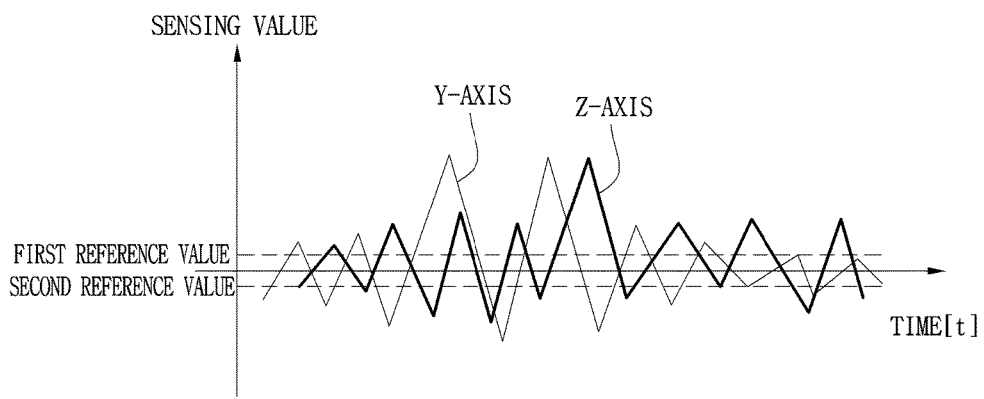

Referring to FIG. 37, the sensing unit 340 of the watch-type terminal 300 may detect sensing values for acceleration in the Y-axis direction and the Z-axis direction of the watch-type terminal 300. Herein, the sensing values for acceleration in the Y-axis direction and the Z-axis direction may be values for movement with respect to the length direction of the watch-type terminal 300. Then, the control unit 380 may detect a user's movement on the basis of the detected sensing value and may obtain movement data on the detected user's movement. Additionally, the control unit 380 may obtain a sensing value of more than a predetermined reference value as movement data on a user's movement. Accordingly, as shown in FIG. 37, the control unit 380 may obtain a sensing value of more than a first reference value or less than a second reference value as movement data on a user's movement.

Figure 38:
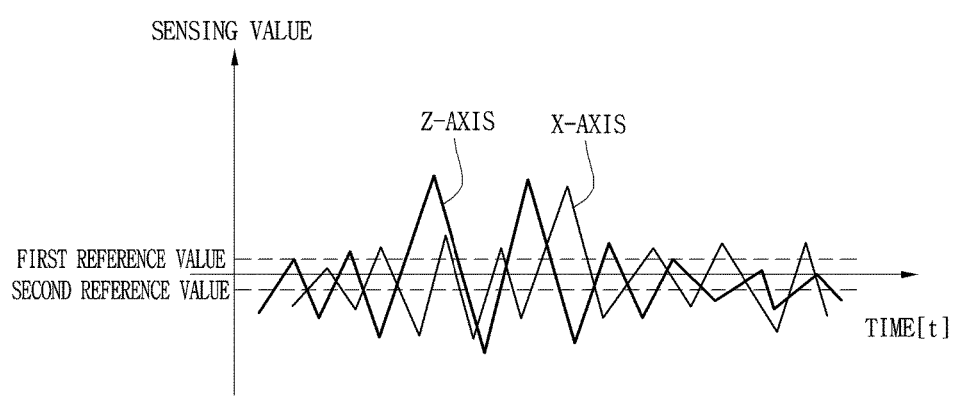

Referring to FIG. 38, the sensing unit 340 of the watch-type terminal 300 may detect sensing values for acceleration in the X-axis direction and the Z-axis direction of the watch-type terminal 300. Herein, the sensing values for acceleration in the X-axis direction and the Z-axis direction may be values for movement with respect to the width direction of the watch-type terminal 300. Then, the control unit 380 may detect a user's movement on the basis of the detected sensing value and may obtain movement data on the detected user's movement. Additionally, the control unit 380 may obtain a sensing value of more than a predetermined reference value as movement data on a user's movement. Accordingly, as shown in FIG. 38, the control unit 380 may obtain a sensing value of more than a first reference value or less than a second reference value as movement data on a user's movement.

Description for the movement detection of the watch-type terminal 300 is exemplary and thus the present invention is not limited thereto. Accordingly, a user's movement may be detected through various methods according to a user's or designer's selection. Additionally, besides the watch-type terminal 300, a user's movement may be detected through the terminal 100, the glass-type terminal 400, and a band-type terminal (not shown).

Again, FIG. 31 will be referred.

The control unit 380 of the watch-type terminal 300 transmits movement data on the detected user's movement to the terminal 100 that is the first terminal in operation S209.

The control unit 380 may transmit the movement data on the detected user's movement to the terminal 100 through a wireless communication unit (not shown). Additionally, the control unit 380 may transmit the movement data on the detected user's movement to a server (not shown) through a wireless communication unit (not shown).

In such a way, the watch-type terminal 300 may detect a movement of a user wearing the watch-type terminal 300 and may transmit movement data on the detected user's movement to the terminal 100 capturing an image. Accordingly, the terminal 100 receiving the movement data may obtain movement data corresponding to a captured image. Thus, the terminal 100 may match the obtained movement information to the captured image and may then store them. Then, during the captured image playback, the terminal 100 may perform a vibration operation for a movement corresponding to the played image. Therefore, it is possible to provide realistic images and various direct experiences to a user of the terminal 100.

In relation to a terminal and an operating method thereof according to an embodiment of the present invention, since a vibration according to a movement corresponding to a captured image is provided, it is possible to provide realistic images to a user.

Additionally, according to an embodiment of the present invention, movement information on an object's movement is obtained through various methods, so that it is possible to provide various indirect experiences on a captured image to a user.

According to an embodiment of the present invention, the above method may be implemented on a program recorded medium as processor readable code. A computer readable medium includes all kinds of recording devices where data readable by a computing system is stored. Examples of the computer readable medium may include Hard Disk Drive (HDD), Solid State Disk (SSD), Silicon Disk Drive (SDD), ROM, RAM, CD-ROM, magnetic tape, floppy disk, and optical data storage devices and also may be implemented in a form of a carrier wave (for example, transmission through internet). Additionally, the computer may include the control unit 180 of a terminal. Accordingly, the above detailed description should not be interpreted as limited in all aspects and should be considered as exemplary. The scope of the present invention is determined by reasonable interpretation of the appended claims and all modifications within the equivalent scope of the present invention are included within the scope of the present invention.

What is claimed is:

1. A method for operating a terminal having a camera and a display, the method comprising:
    recognizing a specific pattern, a specific color, and a specific brightness of light emitted from a plurality of mobile terminals through the camera;
    pairing with the plurality of mobile terminals based on the recognized specific pattern, specific color, and specific brightness of the light;
    capturing an image received via the camera, the captured image including the paired plurality of mobile terminals, each of the paired plurality of mobile terminals worn or carried by a respectively corresponding one of a plurality of users;
    recognizing a plurality of markers, each of the plurality of markers included in a respectively corresponding one of the paired plurality of mobile terminals;
    obtaining movement information of each of the plurality of markers according to movement of the corresponding marker while the image is captured, wherein the obtained movement information includes a movement direction of the corresponding marker;
    storing, in a memory, the captured image and the obtained movement information of the plurality of markers, the stored image and movement information associated with one another;
    displaying, on the display, the stored image; and
    outputting vibration corresponding to the stored movement information while the stored image is displayed such that different vibration patterns and vibration intensities are output at a plurality of points of the terminal, each of the plurality of points respectively corresponding to one of the plurality of markers.

2. The method according to claim 1, wherein the outputting the vibration comprises vibrating each of the plurality of points sequentially or differently according to the movement information.

3. The method according to claim 1, wherein the obtaining the movement information comprises:
    recognizing the marker from the captured image prior to the storing of the image; and
    obtaining the movement information based on an amount of movement of the recognized marker.

4. The method according to claim 1, wherein the movement information comprises information relating to acceleration for each of X-axis, Y-axis, and Z-axis directions of the marker that is changed according to the movement of the marker.

5. A terminal comprising:
    a wireless communication unit;
    a camera;
    a display;
    a memory;
    at least one vibrator; and
    a controller coupled with the display, the memory, and the at least one vibrator, and configured to:
        recognize a specific pattern, a specific color, and a specific brightness of light emitted from a plurality of mobile terminals through the camera;

pair with the plurality of mobile terminals via the wireless communication unit based on the recognized specific pattern, specific color, and specific brightness of the light;

cause the camera to capture an image including the paired plurality of mobile terminals, each of the paired plurality of mobile terminals worn or carried by a respectively corresponding one of a plurality of users;

recognize a plurality of markers, each of the plurality of markers included in a respectively corresponding one of the paired plurality of mobile terminals;

obtain movement information of each of the plurality of marker according to movement of the corresponding marker while the image is captured, wherein the obtained movement information includes a movement direction of the corresponding marker;

store the captured image and the obtained movement information of the plurality of markers in the memory, the stored image and movement information associated with one another; and output vibration corresponding to the stored movement information via the at least one vibrator while the stored image is displayed on the display such that different vibration patterns and vibration intensities are output at a plurality of points of the terminal, each of the plurality of points respectively corresponding to one of the plurality of markers.

6. The terminal according to claim 5, wherein the controller is further configured to cause the at least one vibrator to vibrate each of the plurality of points sequentially or differently according to the movement information.

7. The terminal according to claim 5, wherein the controller is further configured to detect movement of the plurality of markers via the wireless communication unit.

8. The terminal according to claim 5, wherein the controller is further configured to:
recognize the marker from the captured image prior to the storing of the image; and
obtain the movement information based on an amount of movement of the recognized marker.

9. The terminal according to claim 5, wherein the movement information comprises information relating to acceleration for each of X-axis, Y-axis, and Z-axis directions of the marker that is changed according to the movement of the marker.

10. The method according to claim 1, wherein at least one of the plurality of mobile terminals is a wearable terminal wearable on a body part of a user.

11. The method according to claim 10, wherein the wearable terminal comprises a watch-type terminal wearable on a wrist of the user, a glass-type terminal wearable on a head of the user, and a band-type terminal.

12. The method according to claim 10, wherein the wearable terminal is a watch-type terminal.

13. The method according to claim 1, wherein the marker is detachable from the corresponding mobile terminal.

14. The method according to claim 1, further comprising:
obtaining movement data from the paired plurality of mobile terminals.

15. The terminal according to claim 5, wherein the controller is further configured to obtain movement data from the paired plurality of mobile terminals via the wireless communication unit.

* * * * *